(12) United States Patent  
Casati

(10) Patent No.: US 12,532,253 B2
(45) Date of Patent: Jan. 20, 2026

(54) OPERATOR CONTROL OF USER EQUIPMENT BEHAVIOR IN REGISTERING AND DEREGISTERING WITH NETWORK SLICES AND ESTABLISHING AND RELEASING PDU SESSIONS IN A COMMUNICATION SYSTEM

(71) Applicant: NOKIA TECHNOLOGIES OY, Espoo (FI)

(72) Inventor: Alessio Casati, West Molesey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 283 days.

(21) Appl. No.: 18/014,917

(22) PCT Filed: Jun. 15, 2021

(86) PCT No.: PCT/EP2021/066092
§ 371 (c)(1),
(2) Date: Jan. 6, 2023

(87) PCT Pub. No.: WO2022/008179
PCT Pub. Date: Jan. 13, 2022

(65) Prior Publication Data
US 2023/0345352 A1 Oct. 26, 2023

Related U.S. Application Data

(60) Provisional application No. 63/048,818, filed on Jul. 7, 2020.

(51) Int. Cl.
*H04W 48/18* (2009.01)
(52) U.S. Cl.
CPC ................................. *H04W 48/18* (2013.01)

(58) Field of Classification Search
CPC .............................. H04W 48/18; H04W 60/00
See application file for complete search history.

(56) References Cited

U.S. PATENT DOCUMENTS

| 2018/0227873 A1 | 8/2018 | Vrzic et al. |
| 2019/0029065 A1 | 1/2019 | Park et al. |

(Continued)

FOREIGN PATENT DOCUMENTS

| CN | 108323245 A | 7/2018 |
| CN | 108833181 A | 11/2018 |

(Continued)

OTHER PUBLICATIONS

International Search Report and Written Opinion dated Dec. 23, 2021 corresponding to International Patent Application No. PCT/EP2021/066092.

(Continued)

*Primary Examiner* — Marcus Hammonds
(74) *Attorney, Agent, or Firm* — Carter, DeLuca & Farrell LLP

(57) ABSTRACT

Methods, systems, apparatuses, and computer program products for causing configuring user equipment (UE) for operator control of UE behavior in registering and deregistering with network slices and establishing and releasing PDU sessions in a communication system. A network entity can transmitting to UE a registration acceptance message comprising configuration information including instructions for the UE to request all single network slice selection assistance information (S-NSSAI) of a configured network slice selection assistance information (NSSAI) or instructions for the user equipment to request all S-NSSAI of a default configured NSSAI. The network entity can alternatively transmit to UE configuration information in a downlink non access stratum transport message or a UE configuration update message comprising instructions that the user (Continued)

equipment always establishes all protocol data unit (PDU) sessions for all data network names associated with a single network slice selection assistance information (S-NSSAI).

20 Claims, 13 Drawing Sheets

(56) References Cited

U.S. PATENT DOCUMENTS

| | | | |
|---|---|---|---|
| 2019/0124561 A1* | 4/2019 | Faccin | H04W 48/18 |
| 2019/0208573 A1 | 7/2019 | Yang et al. | |
| 2019/0342761 A1 | 11/2019 | Yu et al. | |
| 2019/0349742 A1* | 11/2019 | Kim | H04W 48/16 |
| 2019/0373441 A1 | 12/2019 | Ryu et al. | |
| 2020/0137639 A1 | 4/2020 | Yuan et al. | |
| 2020/0205065 A1* | 6/2020 | Wei | H04W 48/16 |
| 2021/0092634 A1 | 3/2021 | Kang | |

FOREIGN PATENT DOCUMENTS

| | | |
|---|---|---|
| CN | 109257769 A | 1/2019 |
| CN | 109429276 A | 3/2019 |
| CN | 110291837 A | 9/2019 |
| CN | 110366241 A | 10/2019 |
| CN | 110999431 A | 4/2020 |

OTHER PUBLICATIONS

Samsung, "All default S-NSSAI(s) require network slice-specific authentication and authorisation (solution 1)," 3GPP Draft; C1-202124, 3GPP TSG-CT WG1 Meeting #123-e, Electronic meeting, 16-24, Apr. 2020, XP051869580.

ETRI, "The subset of allowed NSSAI provided in the requested NSSAI," 3GPP Draft; C1-183800, 3GPP TSG-CT WG1 Meeting #111, Osaka, Japan, 21-25, May 2018, XP051459859.

Huawei et al., "Storage of allowed NSSAI for PLMNs in TAI list," 3GPP Draft, C1-198929, 3GPP TSG-CT WG1 Meeting #121, Reno, Nevada, USA, Nov. 11-15, 2019, XP051825221.

3GPP TS 23.501 V16.4.0 (Mar. 2020), Technical Specification, 3rd Generation Partnership Project; Technical Specification Group Services and System Aspects; System architecture for the 5G System (5GS); Stage 2 (Release 16), Mar. 2020.

3GPP TR 23.700-40 V0.4.0 (Jun. 2020), Technical Report, 3rd Generation Partnership Project; Technical Specification Group Services and System Aspects; Study on enhancement of network slicing; Phase 2 (Release 17), Jun. 2020.

3GPP TS 23.502 V16.4.0 (Mar. 2020), Technical Specification, 3rd Generation Partnership Project; Technical Specification Group Services and System Aspects; Procedures for the 5G System (5GS); Stage 2 (Release 16), Mar. 2020.

3GPP TS 33.501 V16.2.0 (Mar. 2020), Technical Specification, 3rd Generation Partnership Project; Technical Specification Group Services and System Aspects; Procedures for the 5G System (5GS); Stage 2 (Release 16), Mar. 2020.

3GPP TR 33.899 V1.3.0 (Aug. 2017), Technical Report, 3rd Generation Partnership Project; Technical Specification Group Services and System Aspects; Study on the security aspects of the next generation system (Release 14), Aug. 2017.

Chinese First Office Action for application No. 202180053340.9 dated Apr. 30, 2025 with English machine translation, 11 pages.

Chinese Search Report for application No. 202180053340.9 dated Jan. 9, 2025, 3 pages, no translation available.

* cited by examiner

OPERATOR CONTROL OF USER EQUIPMENT BEHAVIOR IN REGISTERING AND DEREGISTERING WITH NETWORK SLICES AND ESTABLISHING AND RELEASING PDU SESSIONS IN A COMMUNICATION SYSTEM

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

Third generation partnership project (3GPP) 5G technology is a next generation of radio systems and network architecture that can deliver extreme broadband and ultra-robust, low latency connectivity. 5G technology improves a variety of telecommunication services offered to the end users and helps to support massive broadband that delivers gigabytes of bandwidth per second on demand for both the uplink and downlink transmissions. Next generation systems, which utilize the 5G architecture, utilize virtualized radio access network (RAN) functions and core network functions.

In a 5G network, network slicing is a concept for running multiple logical networks as virtually independent business operations on a common physical infrastructure. A network slice is considered as an independent virtualized end-to-end network. Currently, standardization efforts are being made on simplifying the way network slices are defined, how user equipment register and deregister with a network slice, and how a protocol data unit (PDU) session is admitted to a network slice. However, under the current 3GPP specifications, enforcing such activities is complex and typically rests with the user equipment, meaning the network operator has little control over user equipment behavior during such activities.

BRIEF SUMMARY

Methods, apparatuses and computer program products are provided in accordance with example embodiments to provide for operator control of user equipment behavior in registering and deregistering with network slices and establishing and releasing PDU sessions in a communication system.

In one example embodiment, a method is provided that includes receiving, at a network entity of a communications system, from user equipment, a registration request message; in an instance in which the registration request message comprises information indicating the user equipment supports or requires the configuration of network-controlled slice selection behavior, transmitting, in response to receiving the registration request message, from the network entity, to the user equipment, a registration acceptance or rejection message comprising configuration information including instructions for the user equipment to request all single network slice selection assistance information (S-NSSAI) of a configured network slice selection assistance information (NSSAI) or instructions for the user equipment to request all S-NSSAI of a default configured NSSAI; and providing, by a downlink non access stratum transport message or a UE configuration update message, from the network entity, to the user equipment, configuration information comprising instructions for the user equipment to request all S-NSSAI of a configured NSSAI or instructions for the user equipment to request all S-NSSAI of a default configured NSSAI. In some embodiments, the registration acceptance or rejection message or the downlink non access stratum transport or a UE configuration update message comprises instructions for the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI, wherein said one or more S-NSSAIs are determined by the network based on local policy or based on information received from the subscription information of the user equipment. In some embodiments, the registration acceptance or rejection message or the downlink non access stratum transport or a UE configuration update message comprises instructions for the user equipment to only request S-NSSAIs which have active applications. In some embodiments, the registration acceptance or rejection message or the downlink non access stratum transport or a UE configuration update message comprises instructions for the user equipment to release network slices that are no longer used by any application, thereby excluding released network slices from a next requested NSSAI.

According to another embodiment, a method can be carried out that includes receiving, at user equipment, from a network entity of a communications system, in response to a registration request message previously transmitted from the user equipment to the network entity, the registration request message comprising information indicating the user equipment supports or requires the configuration of network-controlled slice selection behavior, a registration acceptance or rejection message comprising instructions for the user equipment to request all single network slice selection assistance information (S-NSSAI) of a configured network slice selection assistance information (NSSAI) or instructions for the user equipment to request all S-NSSAI of a default configured NSSAI; receiving a downlink non access stratum transport message or a UE configuration update message comprising configuration information including instructions for the user equipment to request all S-NSSAI of a configured NSSAI or instructions for the user equipment to request all S-NSSAI of a default configured NSSAI; and configuring the user equipment to request, while it is in the communications systems, all S-NSSAI of the configured NSSAI or the default configured NSSAI. In some embodiments, the registration acceptance or rejection message or downlink non access stratum transport message or a UE configuration update message comprises instructions for the user equipment to always request a subset of S-NSSAIs in the configured NSSAI, the method further comprising: configuring the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI. In some embodiments, the registration acceptance or rejection message or downlink non access stratum transport message or a UE configuration update message comprises instructions for the user equipment to only request S-NSSAIs which have active applications, the method further comprising: configuring the user equipment to only request S-NSSAIs which have active applications. In some embodiments, the registration acceptance or rejection message downlink non access stratum transport message or a UE configuration update message comprises a timer configured to cause the user equipment to release network slices that are no longer used by any application, thereby excluding released network slices from a next requested NSSAI, the method further comprising: configuring the user equipment to release, based upon a value of said timer, network slices that are no longer used by any application and excluding the released network slice from the next requested NSSAI.

According to another embodiment, an apparatus can be provided that comprises at least one processor and at least one memory including computer program code for one or more programs, the at least one memory and the computer program code configured to, with the at least one processor, cause the apparatus at least to: receive, at the apparatus, from user equipment, a registration request message; in an instance in which the registration request message comprises information indicating the user equipment supports or requires the configuration of network-controlled slice selection behavior, transmit, in response to receiving the registration request message, from the apparatus, to the user equipment, a registration acceptance or rejection message comprising configuration information including instructions for the user equipment to request all single network slice selection assistance information (S-NSSAI) of a configured network slice selection assistance information (NSSAI) or instructions for the user equipment to request all S-NSSAI of a default configured NSSAI; and provide, by a downlink non access stratum transport message or a UE configuration update message, from the apparatus, to the user equipment, configuration information comprising instructions for the user equipment to request all S-NSSAI of a configured NSSAI or instructions for the user equipment to request all S-NSSAI of a default configured NSSAI. In some embodiments, the registration acceptance or rejection message or the downlink non access stratum transport or a UE configuration update message comprises instructions for the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI, wherein said one or more S-NSSAIs are determined by the network based on local policy or based on information received from the subscription information of the user equipment. In some embodiments, the registration acceptance or rejection message or the downlink non access stratum transport or a UE configuration update message comprises instructions for the user equipment to only request S-NSSAIs which have active applications. In some embodiments, the registration acceptance or rejection message or the downlink non access stratum transport or a UE configuration update message comprises instructions for the user equipment to release network slices that are no longer used by any application, thereby excluding released network slices from a next requested NSSAI.

According to still another embodiment, an apparatus can be provided that comprises at least one processor and at least one memory including computer program code for one or more programs, the at least one memory and the computer program code configured to, with the at least one processor, cause the apparatus at least to: receive, at the apparatus, from a network entity of a communications system, in response to a registration request message previously transmitted from the apparatus to the network entity, the registration request message comprising information indicating the apparatus supports or requires the configuration of network-controlled slice selection behavior, a registration acceptance or rejection message comprising instructions for the apparatus to request all single network slice selection assistance information (S-NSSAI) of a configured network slice selection assistance information (NSSAI) or instructions for the apparatus to request all S-NSSAI of a default configured NSSAI; receive a downlink non access stratum transport message or a UE configuration update message comprising configuration information including instructions for the apparatus to request all S-NSSAI of a configured NSSAI or instructions for the apparatus to request all S-NSSAI of a default configured NSSAI; and configure the apparatus to request, while the apparatus is in the communications systems, all S-NSSAI of the configured NSSAI or the default configured NSSAI. In some embodiments, the registration acceptance message comprises instructions for the apparatus to always request a subset of S-NSSAIs in the configured NSSAI, and wherein the at least one memory and the computer program code are configured to, with the at least one processor, to further: configuring the apparatus to always request a subset of S-NSSAIs in the configured NSSAI. In some embodiments, the subset of S-NSSAIs is identified by one or more flags associated with each S-NSSAI provided to the apparatus in the configured NSSAI or the default configured NSSAI. In some embodiments, the registration acceptance or rejection message or downlink non access stratum transport message or a UE configuration update message comprises instructions for the apparatus to only request S-NSSAIs which have active applications, and wherein the at least one memory and the computer program code are configured to, with the at least one processor, to further: configure the apparatus to only request S-NSSAIs which have active applications. In some embodiments, the registration acceptance or rejection message downlink non access stratum transport message or a UE configuration update message comprises a timer configured to cause the apparatus to release network slices that are no longer used by any application, thereby excluding released network slices from a next requested NSSAI, and wherein the at least one memory and the computer program code are configured to, with the at least one processor, to further: configuring the apparatus to release, based upon a value of said timer, network slices that are no longer used by any application and excluding the released network slice from the next requested NSSAI.

According to yet another embodiment, an apparatus can be provided that comprises means for receiving, at a network entity of a communications system, from user equipment, a registration request message; means for, in an instance in which the registration request message comprises information indicating the user equipment supports or requires the configuration of network-controlled slice selection behavior, transmitting, in response to receiving the registration request message, from the network entity, to the user equipment, a registration acceptance or rejection message comprising configuration information including instructions for the user equipment to request all single network slice selection assistance information (S-NSSAI) of a configured network slice selection assistance information (NSSAI) or instructions for the user equipment to request all S-NSSAI of a default configured NSSAI; and means for providing, by a downlink non access stratum transport message or a UE configuration update message, from the network entity, to the user equipment, configuration information comprising instructions for the user equipment to request all S-NSSAI of a configured NSSAI or instructions for the user equipment to request all S-NSSAI of a default configured NSSAI. In some embodiments, the registration acceptance or rejection message or the downlink non access stratum transport or a UE configuration update message comprises instructions for the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI, wherein said one or more S-NSSAIs are determined by the network based on local policy or based on information received from the subscription information of the user equipment. In some embodiments, the registration acceptance or rejection message or the downlink non access stratum transport or a UE configuration update message comprises instructions for the user equipment to only request S-NSSAIs which have active applications. In some embodiments, the registration acceptance or rejection message or the downlink non access stratum transport or a UE configuration update message comprises instructions for the user equipment to release network slices that are no longer used by any application, thereby excluding released network slices from a next requested NSSAI.

According to still another embodiment, an apparatus can be provided that comprises means for receiving, at user equipment, from a network entity of a communications system, in response to a registration request message previously transmitted from the user equipment to the network entity, the registration request message comprising information indicating the user equipment supports or requires the configuration of network-controlled slice selection behavior, a registration acceptance or rejection message comprising instructions for the user equipment to request all single network slice selection assistance information (S-NSSAI) of a configured network slice selection assistance information (NSSAI) or instructions for the user equipment to request all S-NSSAI of a default configured NSSAI; means for receiving a downlink non access stratum transport or a UE configuration update message message comprising configuration information including instructions for the user equipment to request all S-NSSAI of a configured NSSAI or instructions for the user equipment to request all S-NSSAI of a default configured NSSAI; and means for configuring the user equipment to request, while it is in the communications systems, all S-NSSAI of the configured NSSAI or the default configured NSSAI. In some embodiments, the registration acceptance or rejection message or downlink non access stratum transport message or a UE configuration update message comprises instructions for the user equipment to always request a subset of S-NSSAIs in the configured NSSAI, the apparatus further comprising: means for configuring the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI. In some embodiments, the registration acceptance or rejection message or downlink non access stratum transport message or a UE configuration update message comprises instructions for the user equipment to only request S-NSSAIs which have active applications, the apparatus further comprising: means for configuring the user equipment to only request S-NSSAIs which have active applications. In some embodiments, the registration acceptance or rejection message downlink non access stratum transport message or a UE configuration update message comprises a timer configured to cause the user equipment to release network slices that are no longer used by any application, thereby excluding released network slices from a next requested NSSAI, the apparatus further comprising: means for configuring the user equipment to release, based upon a value of said timer, network slices that are no longer used by any application and excluding the released network slice from the next requested NSSAI.

According to another embodiment, a computer program product can be provided that comprises at least one non-transitory computer-readable storage medium having computer-executable program code instructions stored therein, the computer-executable program code instructions comprising program code instructions configured, upon execution, to: receive, at a network entity of a communications system, from user equipment, a registration request message; in an instance in which the registration request message comprises information indicating the user equipment supports or requires the configuration of network-controlled slice selection behavior, transmit, in response to receiving the registration request message, from the network entity, to the user equipment, a registration acceptance or rejection message comprising configuration information including instructions for the user equipment to request all single network slice selection assistance information (S-NSSAI) of a configured network slice selection assistance information (NSSAI) or instructions for the user equipment to request all S-NSSAI of a default configured NSSAI; and provide, by a downlink non access stratum transport message or a UE configuration update message, from the network entity, to the user equipment, configuration information comprising instructions for the user equipment to request all S-NSSAI of a configured NSSAI or instructions for the user equipment to request all S-NSSAI of a default configured NSSAI. In some embodiments, the registration acceptance or rejection message or the downlink non access stratum transport or a UE configuration update message comprises instructions for the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI, wherein said one or more S-NSSAIs are determined by the network based on local policy or based on information received from the subscription information of the user equipment. In some embodiments, the registration acceptance or rejection message or the downlink non access stratum transport or a UE configuration update message comprises instructions for the user equipment to only request S-NSSAIs which have active applications. In some embodiments, the registration acceptance or rejection message or the downlink non access stratum transport or a UE configuration update message comprises instructions for the user equipment to release network slices that are no longer used by any application, thereby excluding released network slices from a next requested NSSAI.

According to still another embodiment, a computer program product comprising at least one non-transitory computer-readable storage medium having computer-executable program code instructions stored therein, the computer-executable program code instructions comprising program code instructions configured, upon execution, to: receive, at user equipment, from a network entity of a communications system, in response to a registration request message previously transmitted from the user equipment to the network entity, the registration request message comprising information indicating the user equipment supports or requires the configuration of network-controlled slice selection behavior, a registration acceptance or rejection message comprising instructions for the user equipment to request all single network slice selection assistance information (S-NSSAI) of a configured network slice selection assistance information (NSSAI) or instructions for the user equipment to request all S-NSSAI of a default configured NSSAI; receive a downlink non access stratum transport message or a UE configuration update message comprising configuration information including instructions for the user equipment to request all S-NSSAI of a configured NSSAI or instructions for the user equipment to request all S-NSSAI of a default configured NSSAI; and configure the user equipment to request, while it is in the communications systems, all S-NSSAI of the configured NSSAI or the default configured NSSAI. In some embodiments, the registration acceptance or rejection message or downlink non access stratum transport message or a UE configuration update message comprises instructions for the user equipment to always request a subset of S-NSSAIs in the configured NSSAI, and wherein the computer-executable program code instructions comprising program code instructions configured, upon execution, to: configure the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI. In some embodiments, the registration acceptance or rejection message or downlink non access stratum transport message or a UE configuration update message comprises instructions for the user equipment to only request S-NSSAIs which have active applications, and wherein the computer-executable program code instructions comprising program code instructions configured, upon execution, to: configure the user equipment to only request S-NSSAIs which have active applications. In some embodiments, the registration acceptance or rejection message downlink non access stratum transport message or a UE configuration update message comprises a timer configured to cause the user equipment to release network slices that are no longer used by any application, thereby excluding released network slices from a next requested NSSAI, and wherein the computer-executable program code instructions comprising program code instructions configured, upon execution, to: configure the user equipment to release, based upon a value of said timer, network slices that are no longer used by any application and excluding the released network slice from the next requested NSSAI.

According to still another embodiment, a method can be carried out that comprises receiving, at user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI); and configuring the user equipment to always establish all PDU sessions for all data network names associated with a S-NSSAI. In some embodiments, the configuration information comprises a request that the user equipment, by default, establishes a specific PDU session or subset of PDU sessions, associated with a S-NSSAI, if identified by a data network name associated with a flag, the method further comprising: configuring the user equipment to, by default, establish the specific PDU session or the subset of PDU sessions, associated with a S-NSSAI, if identified by a data network name associated with a flag. In some embodiments, the configuration information comprises a request that the user equipment at least establish a PDU session in a network slice identified by a S-NSSAI when no DNN is configured for the S-NSSAI, the method further comprising: configuring the user equipment to at least establish a PDU session in a network slice identified by a S-NSSAI when no DNN is configured for the S-NSSAI. In some embodiments, the configuration information comprises a request that the user equipment only establish a PDU session in a network slice identified by a S-NSSAI when at least one application needs to use the PDU session, the method further comprising: configuring the user equipment to only establish a PDU session in a network slice identified by a S-NSSAI when at least one application needs to use the PDU session. In some embodiments, the configuration information comprises a request that the user equipment provide an explicit timer that causes the user equipment to release PDU sessions that are no longer associated with any applications, the method further comprising: configuring the user equipment to provide the explicit timer that causes the user equipment to release PDU sessions that are no longer associated with any applications.

According to another embodiment, an apparatus can be provided that comprises at least one processor and at least one memory including computer program code for one or more programs, the at least one memory and the computer program code configured to, with the at least one processor, cause the apparatus at least to: receive, at the apparatus, from a network entity in a communications system, configuration information in a downlink non access stratum transport message or a UE configuration update message comprising instructions that the apparatus always establishes all protocol data unit (PDU) sessions for all data network names associated with a single network slice selection assistance information (S-NSSAI); and configure the apparatus to always establish all PDU sessions for all data network names associated with a S-NSSAI. In some embodiments, the configuration information comprises a request that the apparatus, by default, establishes a specific PDU session or subset of PDU sessions, associated with a S-NSSAI, if identified by a data network name associated with a flag, wherein the at least one memory and the computer program code are further configured to, with the at least one processor, cause the apparatus at least to: configure the apparatus to, by default, establish the specific PDU session or the subset of PDU sessions, associated with a S-NSSAI, if identified by a data network name associated with a flag. In some embodiments, the configuration information comprises a request that the apparatus at least establish a PDU session in a network slice identified by a S-NSSAI when no DNN is configured for the S-NSSAI, wherein the at least one memory and the computer program code are further configured to, with the at least one processor, cause the apparatus at least to: configure the apparatus to at least establish a PDU session in a network slice identified by a S-NSSAI when no DNN is configured for the S-NSSAI. In some embodiments, the configuration information comprises a request that the apparatus only establish a PDU session in a network slice identified by a S-NSSAI when at least one application needs to use the PDU session, wherein the at least one memory and the computer program code are further configured to, with the at least one processor, cause the apparatus at least to: configure the apparatus to only establish a PDU session in a network slice identified by a S-NSSAI when at least one application needs to use the PDU session. In some embodiments, the configuration information comprises a request that the apparatus provide an explicit timer that causes the apparatus to release PDU sessions that are no longer associated with any applications, wherein the at least one memory and the computer program code are further configured to, with the at least one processor, cause the apparatus at least to: configure the apparatus to provide the explicit timer that causes the apparatus to release PDU sessions that are no longer associated with any applications.

According to another embodiment, an apparatus is provided that can comprise means for receiving, at the apparatus, from a network entity in a communications system, configuration information in a downlink non access stratum transport message or a UE configuration update message comprising instructions that the apparatus always establishes all protocol data unit (PDU) sessions for all data network names associated with a single network slice selection assistance information (S-NSSAI); and means for configuring the apparatus to always establish all PDU sessions for all data network names associated with a S-NSSAI. In some embodiments, the configuration information comprises a request that the apparatus, by default, establishes a specific PDU session or subset of PDU sessions, associated with a S-NSSAI, if identified by a data network name associated with a flag, the apparatus further comprising: means for configuring the apparatus to, by default, establish the specific PDU session or the subset of PDU sessions, associated with a S-NSSAI, if identified by a data network name associated with a flag. In some embodiments, the configuration information comprises a request that the apparatus at least establish a PDU session in a network slice identified by a S-NSSAI when no DNN is configured for the S-NSSAI, the apparatus further comprising: means for configuring the apparatus to at least establish a PDU session in a network slice identified by a S-NSSAI when no DNN is configured for the S-NSSAI. In some embodiments, the configuration information comprises a request that the apparatus only establish a PDU session in a network slice identified by a S-NSSAI when at least one application needs to use the PDU session, the apparatus further comprising: means for configuring the apparatus to only establish a PDU session in a network slice identified by a S-NSSAI when at least one application needs to use the PDU session. In some embodiments, the configuration information comprises a request that the apparatus provide an explicit timer that causes the apparatus to release PDU sessions that are no longer associated with any applications, the apparatus further comprising: means for configuring the apparatus to provide the explicit timer that causes the apparatus to release PDU sessions that are no longer associated with any applications.

According to another embodiment, a computer program product can be provided that comprises at least one non-transitory computer-readable storage medium having computer-executable program code instructions stored therein, the computer-executable program code instructions comprising program code instructions configured, upon execution, to: receive, at user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI); and configure the user equipment to always establish all PDU sessions for all data network names associated with a S-NSSAI. In some embodiments, the configuration information comprises a request that the user equipment, by default, establishes a specific PDU session or subset of PDU sessions, associated with a S-NSSAI, if identified by a data network name associated with a flag, wherein the computer-executable program code instructions further comprise program code instructions configured, upon execution, to: configuring the user equipment to, by default, establish the specific PDU session or the subset of PDU sessions, associated with a S-NSSAI, if identified by a data network name associated with a flag. In some embodiments, the configuration information comprises a request that the user equipment at least establish a PDU session in a network slice identified by a S-NSSAI when no DNN is configured for the S-NSSAI, wherein the computer-executable program code instructions further comprise program code instructions configured, upon execution, to: configure the user equipment to at least establish a PDU session in a network slice identified by a S-NSSAI when no DNN is configured for the S-NSSAI. In some embodiments, the configuration information comprises a request that the user equipment only establish a PDU session in a network slice identified by a S-NSSAI when at least one application needs to use the PDU session, wherein the computer-executable program code instructions further comprise program code instructions configured, upon execution, to: configuring the user equipment to only establish a PDU session in a network slice identified by a S-NSSAI when at least one application needs to use the PDU session. In some embodiments, the configuration information comprises a request that the user equipment provide an explicit timer that causes the user equipment to release PDU sessions that are no longer associated with any applications, wherein the computer-executable program code instructions further comprise program code instructions configured, upon execution, to: configuring the user equipment to provide the explicit timer that causes the user equipment to release PDU sessions that are no longer associated with any applications.

According to still another embodiment, a method can be carried out that includes providing, to user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI). In some embodiments, the configuration information comprises a request that the user equipment, by default, establishes a specific PDU session or subset of PDU sessions, associated with a S-NSSAI, if identified by a data network name associated with a flag. In some embodiments, the configuration information comprises a request that the user equipment at least establish a PDU session in a network slice identified by a S-NSSAI when no DNN is configured for the S-NSSAI. In some embodiments, the configuration information comprises a request that the user equipment only establish a PDU session in a network slice identified by a S-NSSAI when at least one application needs to use the PDU session. In some embodiments, the configuration information comprises a request that the user equipment provide an explicit timer that causes the user equipment to release PDU sessions that are no longer associated with any applications.

According to still another embodiment, an apparatus can be provided that comprises at least one processor and at least one memory including computer program code for one or more programs, the at least one memory and the computer program code configured to, with the at least one processor, cause the apparatus at least to: provide, to user equipment, from the apparatus, configuration information in a downlink non access stratum transport or a UE configuration update message comprising instructions that the user equipment always establishes all protocol data unit (PDU) sessions for all data network names associated with a single network slice selection assistance information (S-NSSAI). In some embodiments, the configuration information comprises a request that the apparatus, by default, establishes a specific PDU session or subset of PDU sessions, associated with a S-NSSAI, if identified by a data network name associated with a flag. In some embodiments, the configuration information comprises a request that the apparatus at least establish a PDU session in a network slice identified by a S-NSSAI when no DNN is configured for the S-NSSAI. In some embodiments, the configuration information comprises a request that the apparatus only establish a PDU session in a network slice identified by a S-NSSAI when at least one application needs to use the PDU session. In some embodiments, the configuration information comprises a request that the apparatus provide an explicit timer that causes the apparatus to release PDU sessions that are no longer associated with any applications.

According to still another embodiment, an apparatus can be provided that comprises means for providing, to user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI). In some embodiments, the configuration information comprises a request that the apparatus, by default, establishes a specific PDU session or subset of PDU sessions, associated with a S-NSSAI, if identified by a data network name associated with a flag. In some embodiments, the configuration information comprises a request that the apparatus at least establish a PDU session in a network slice identified by a S-NSSAI when no DNN is configured for the S-NSSAI. In some embodiments, the configuration information comprises a request that the apparatus only establish a PDU session in a network slice identified by a S-NSSAI when at least one application needs to use the PDU session. In some embodiments, the configuration information comprises a request that the apparatus provide an explicit timer that causes the apparatus to release PDU sessions that are no longer associated with any applications.

According to yet another embodiment, a computer program product can be provided that comprises at least one non-transitory computer-readable storage medium having computer-executable program code instructions stored therein, the computer-executable program code instructions comprising program code instructions configured, upon execution, to: provide, to user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI). In some embodiments, the configuration information comprises a request that the user equipment, by default, establishes a specific PDU session or subset of PDU sessions, associated with a S-NSSAI, if identified by a data network name associated with a flag. In some embodiments, the configuration information comprises a request that the user equipment at least establish a PDU session in a network slice identified by a S-NSSAI when no DNN is configured for the S-NSSAI. In some embodiments, the configuration information comprises a request that the user equipment only establish a PDU session in a network slice identified by a S-NSSAI when at least one application needs to use the PDU session. In some embodiments, the configuration information comprises a request that the user equipment provide an explicit timer that causes the user equipment to release PDU sessions that are no longer associated with any applications.

BRIEF DESCRIPTION OF THE DRAWINGS

Figure 1:
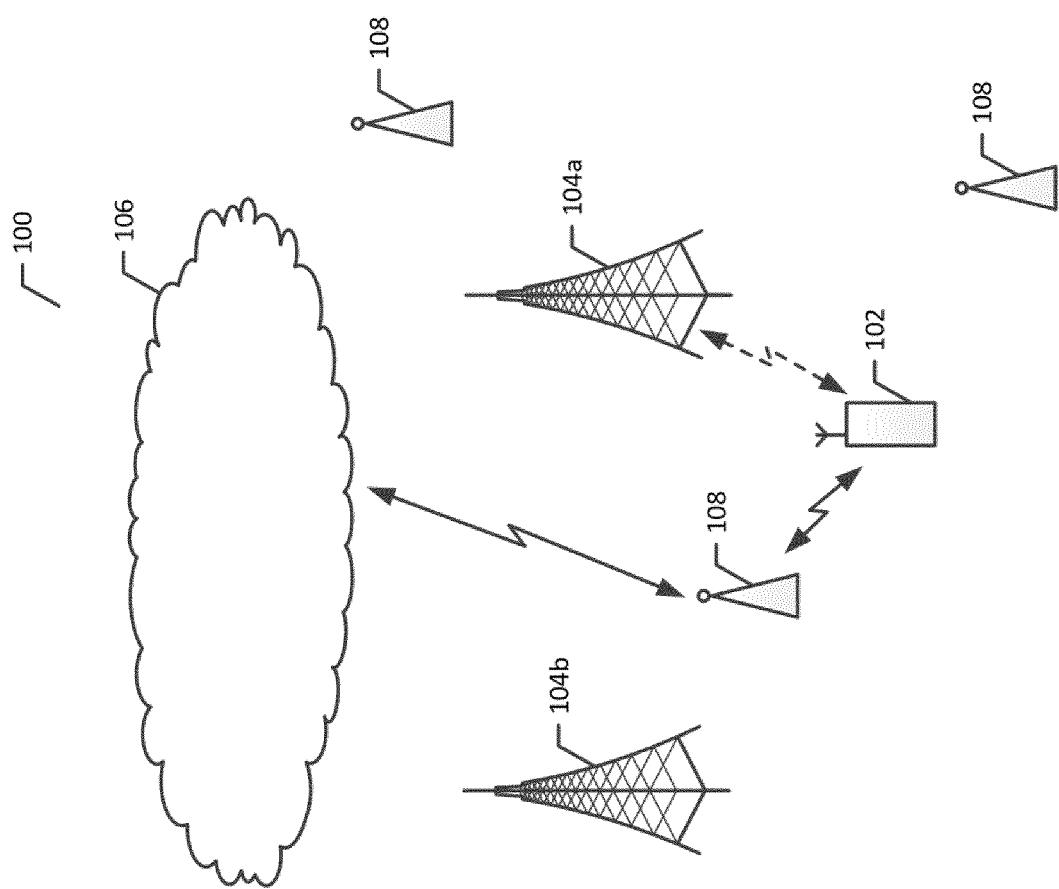
Figure 2:
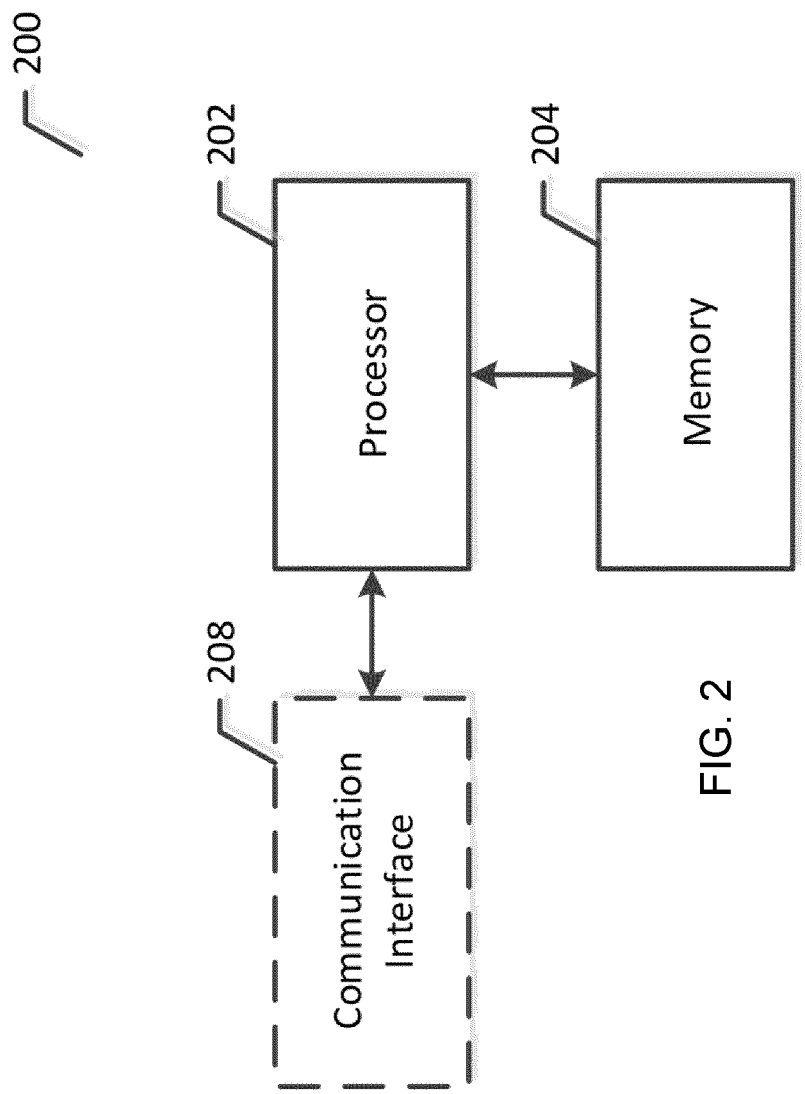
Figure 3:
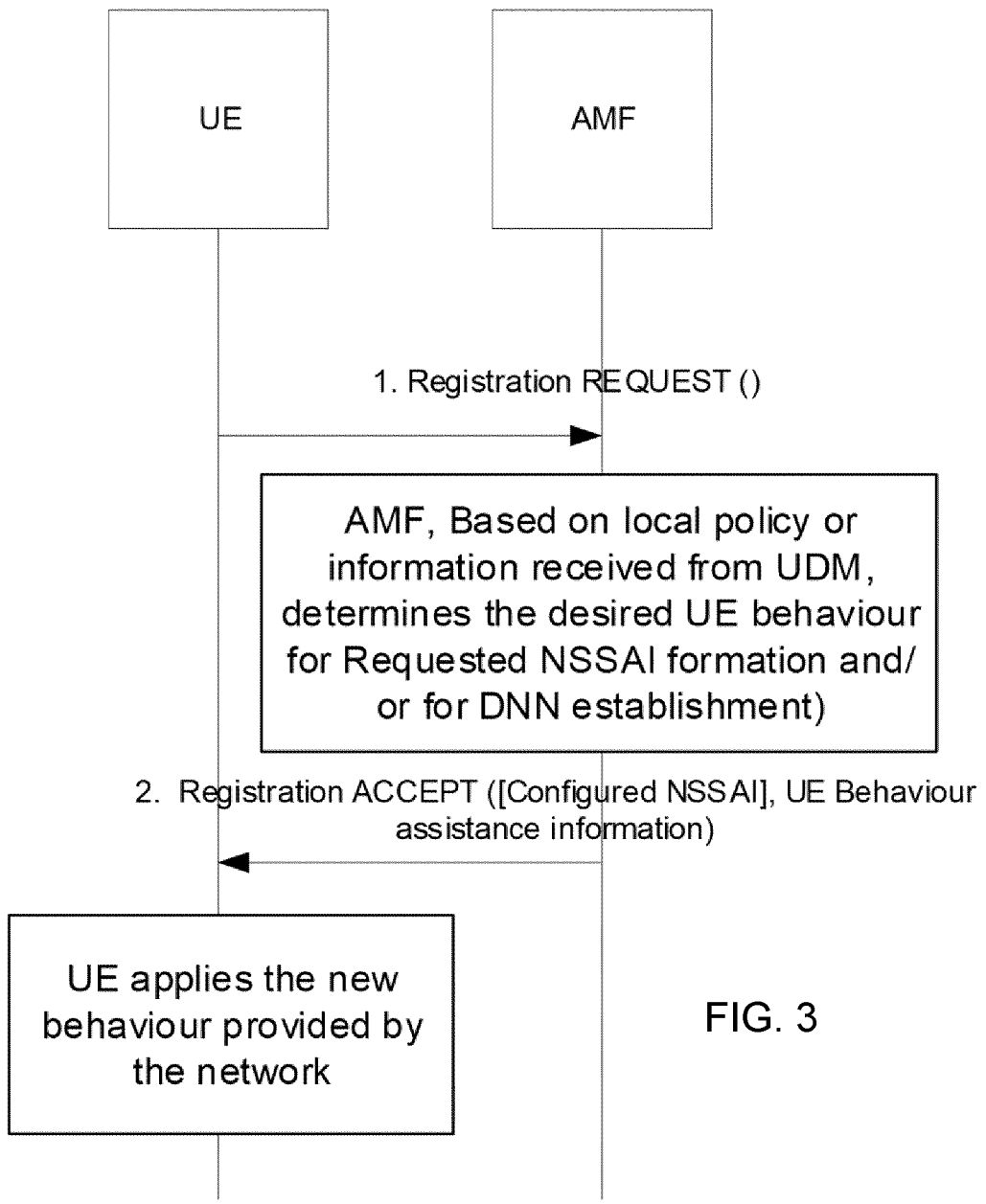
Figure 4:
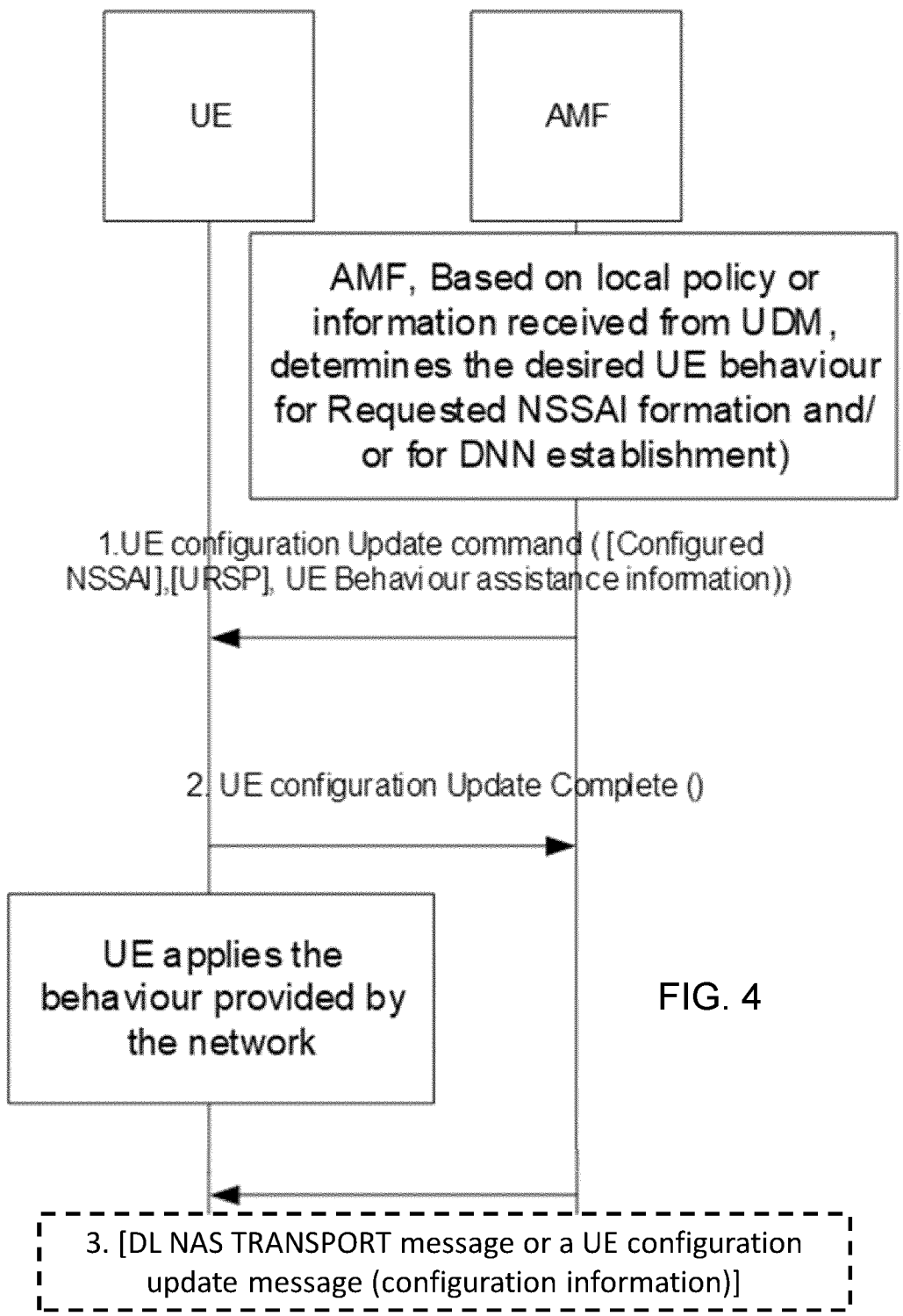
Figure 5:
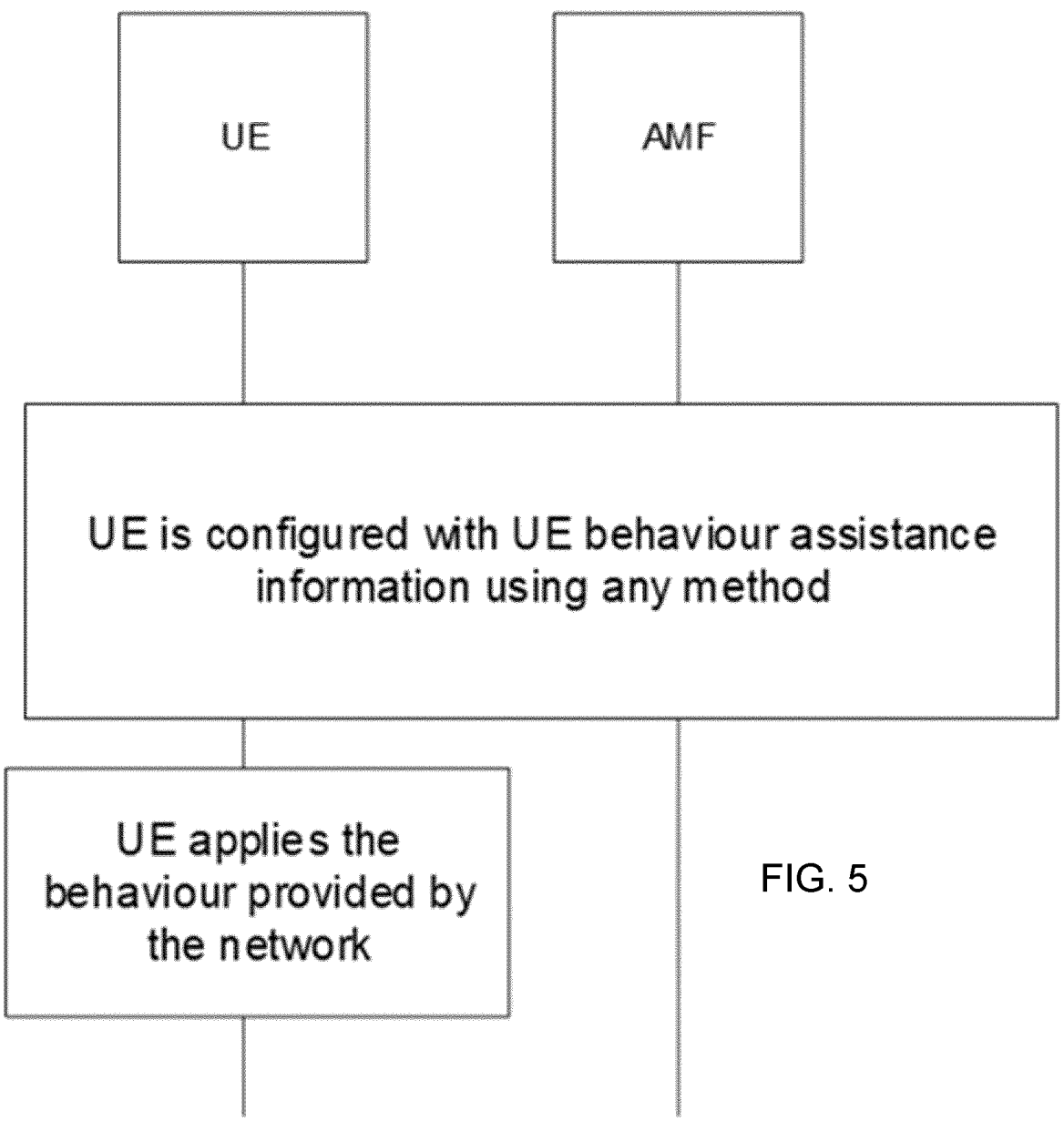
Figure 6:
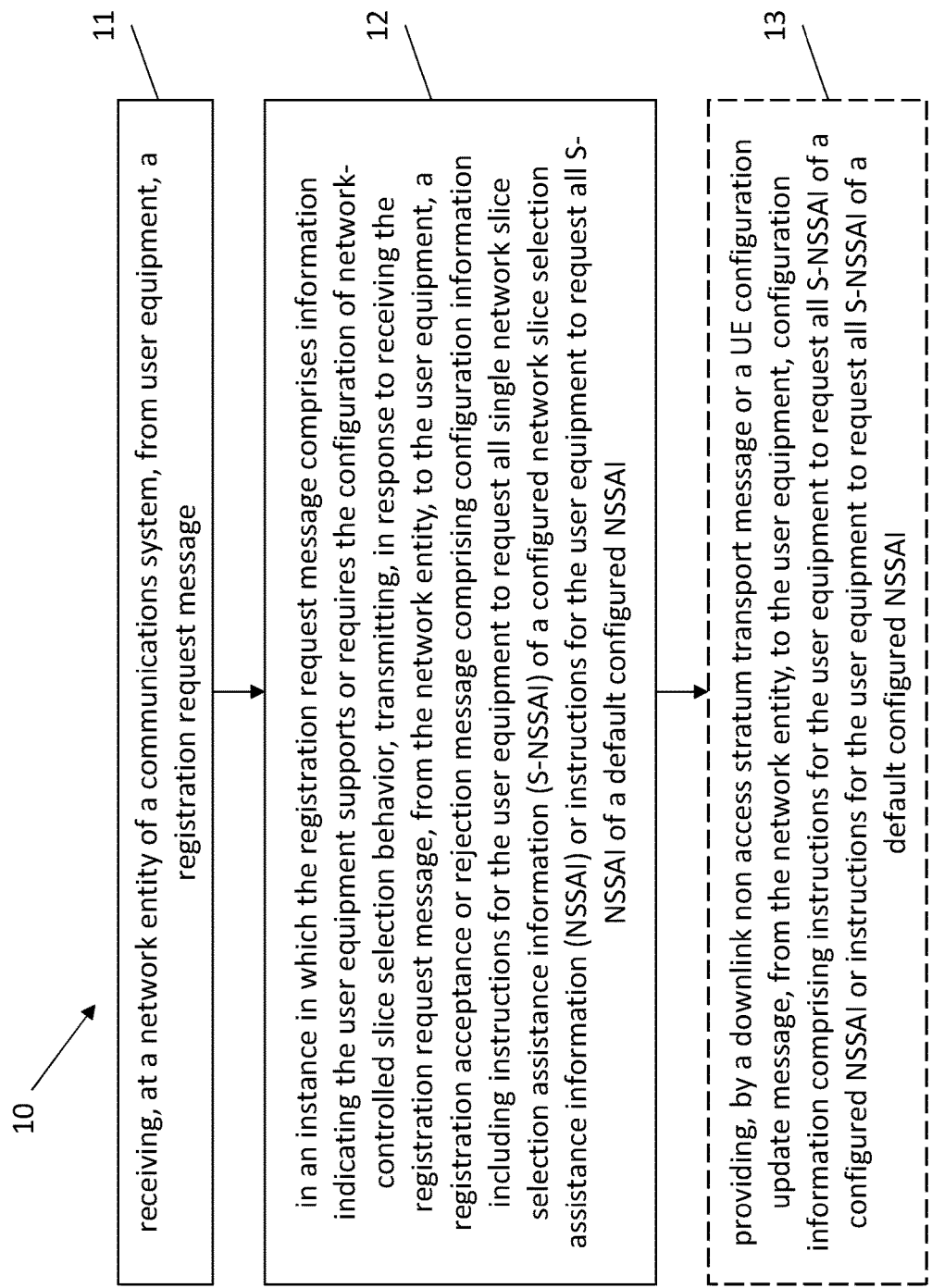
Figure 7:
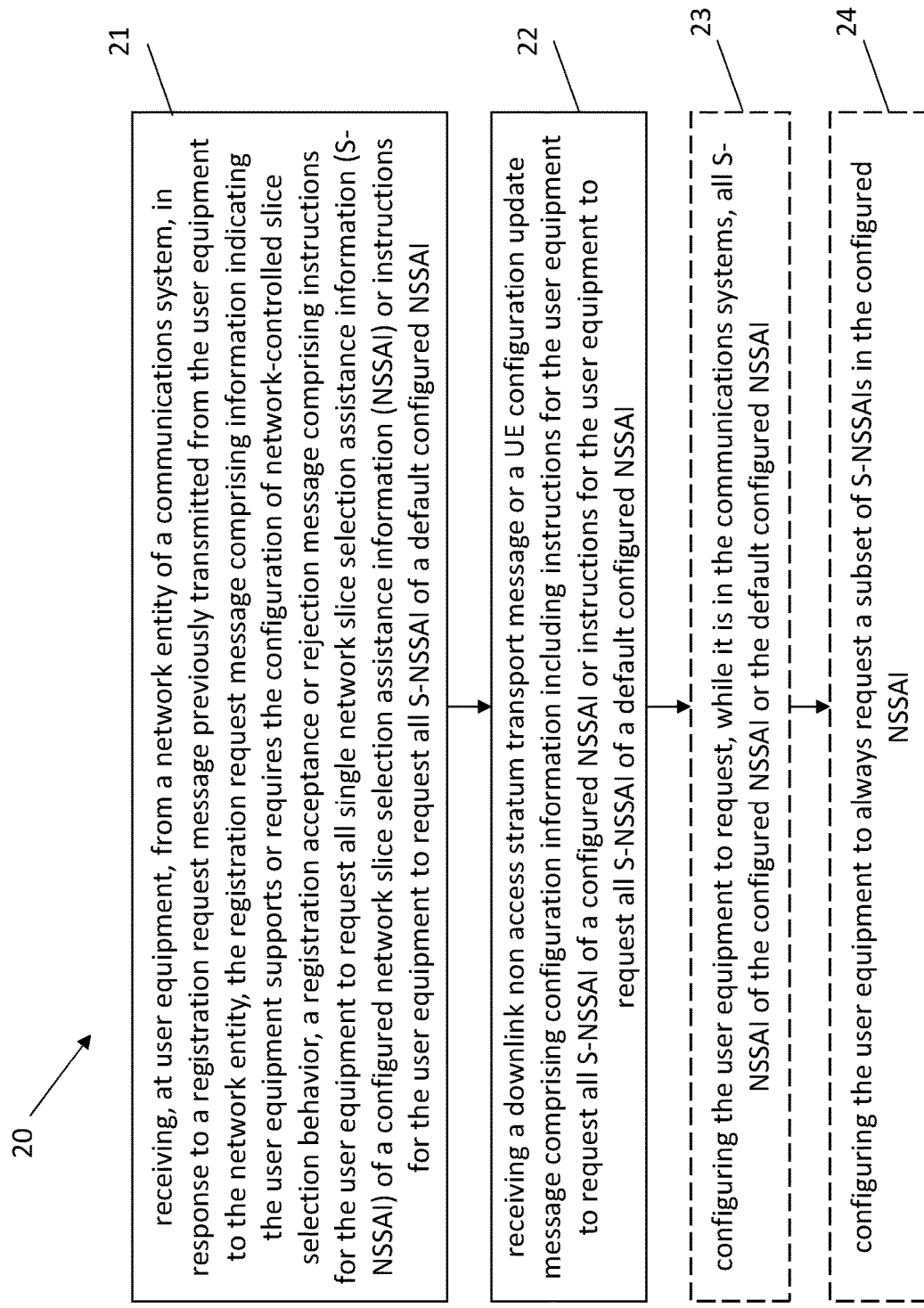
Figure 8:
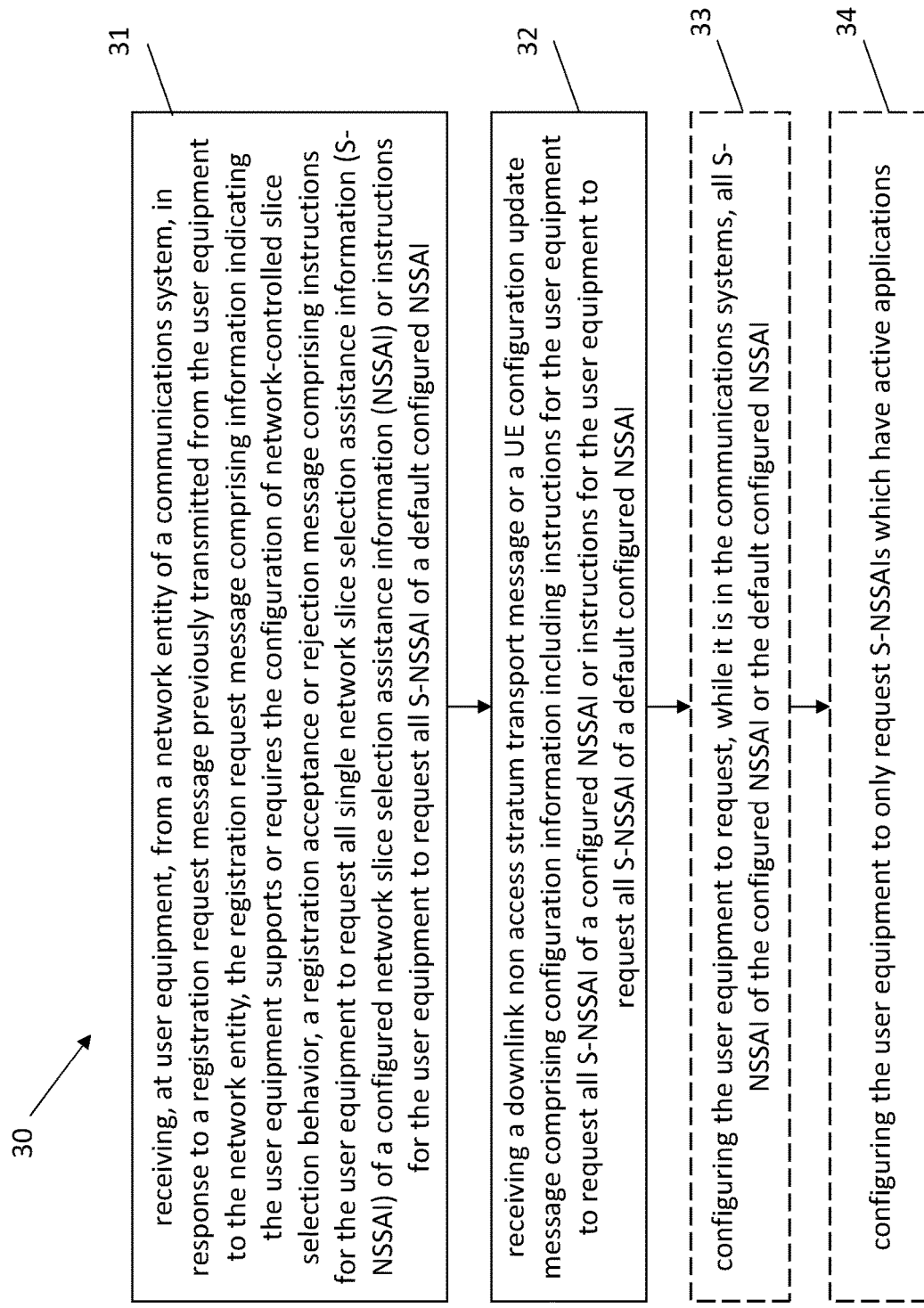
Figure 9:
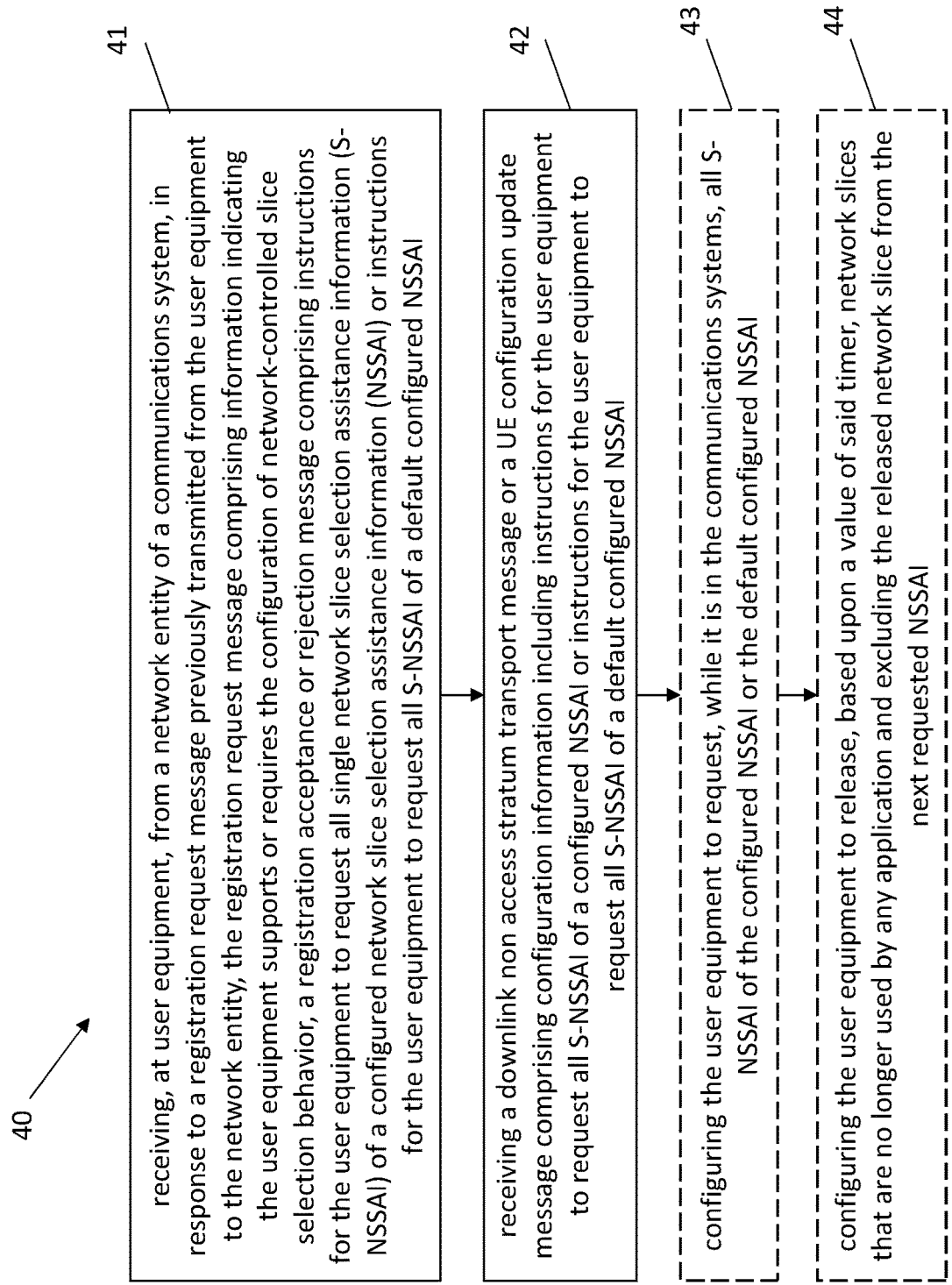
Figure 10:
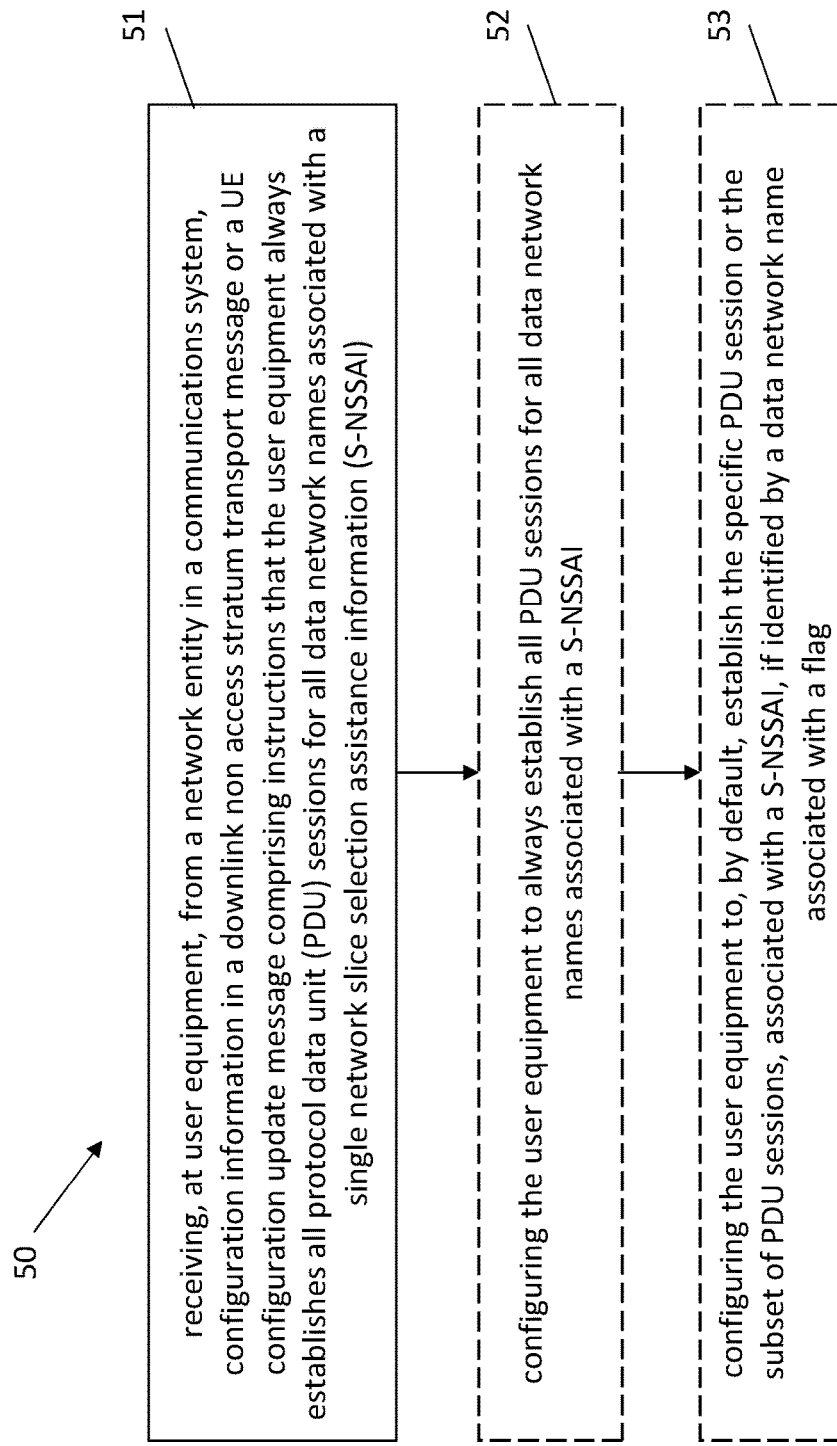
Figure 11:
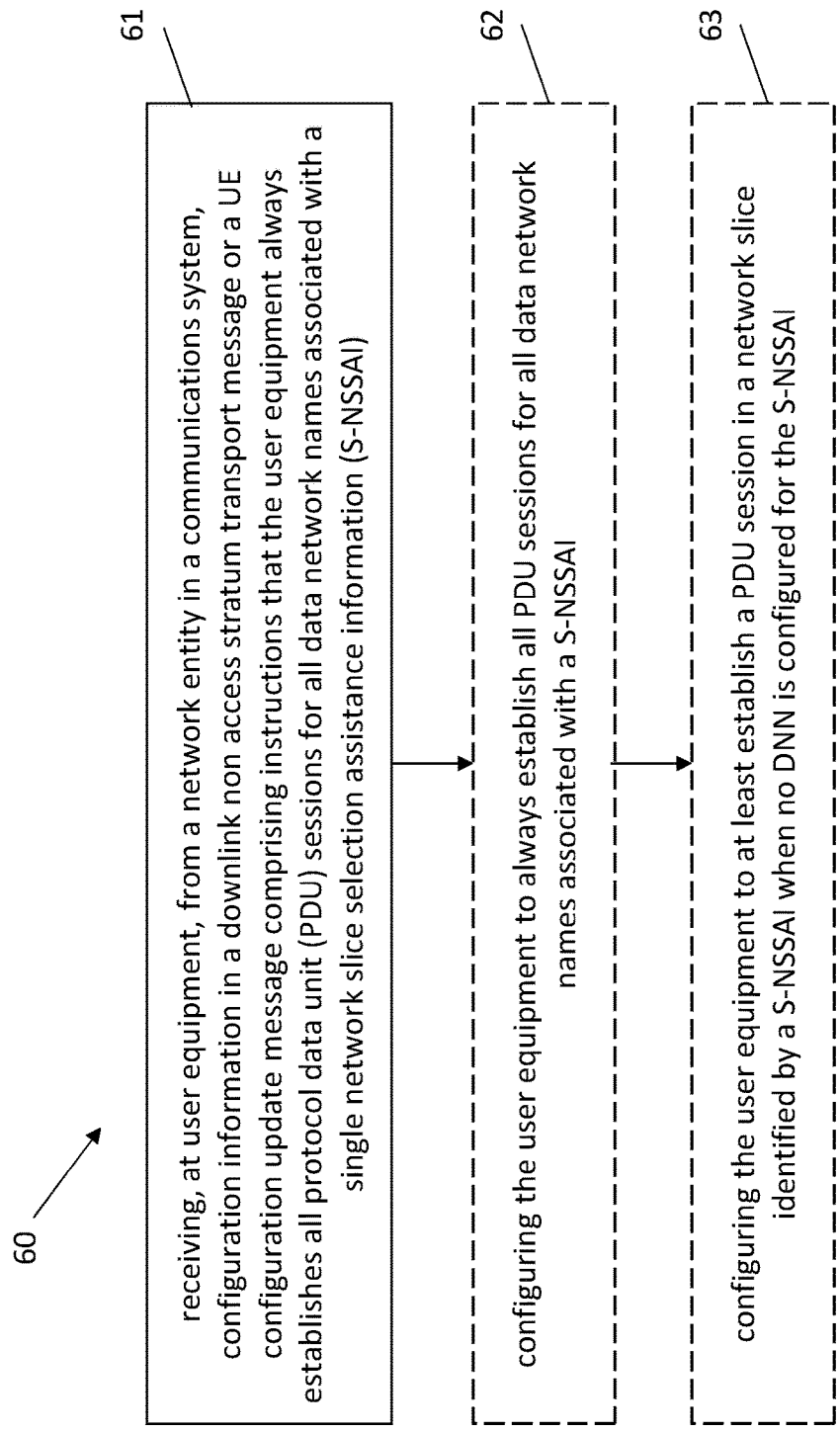
Figure 12:
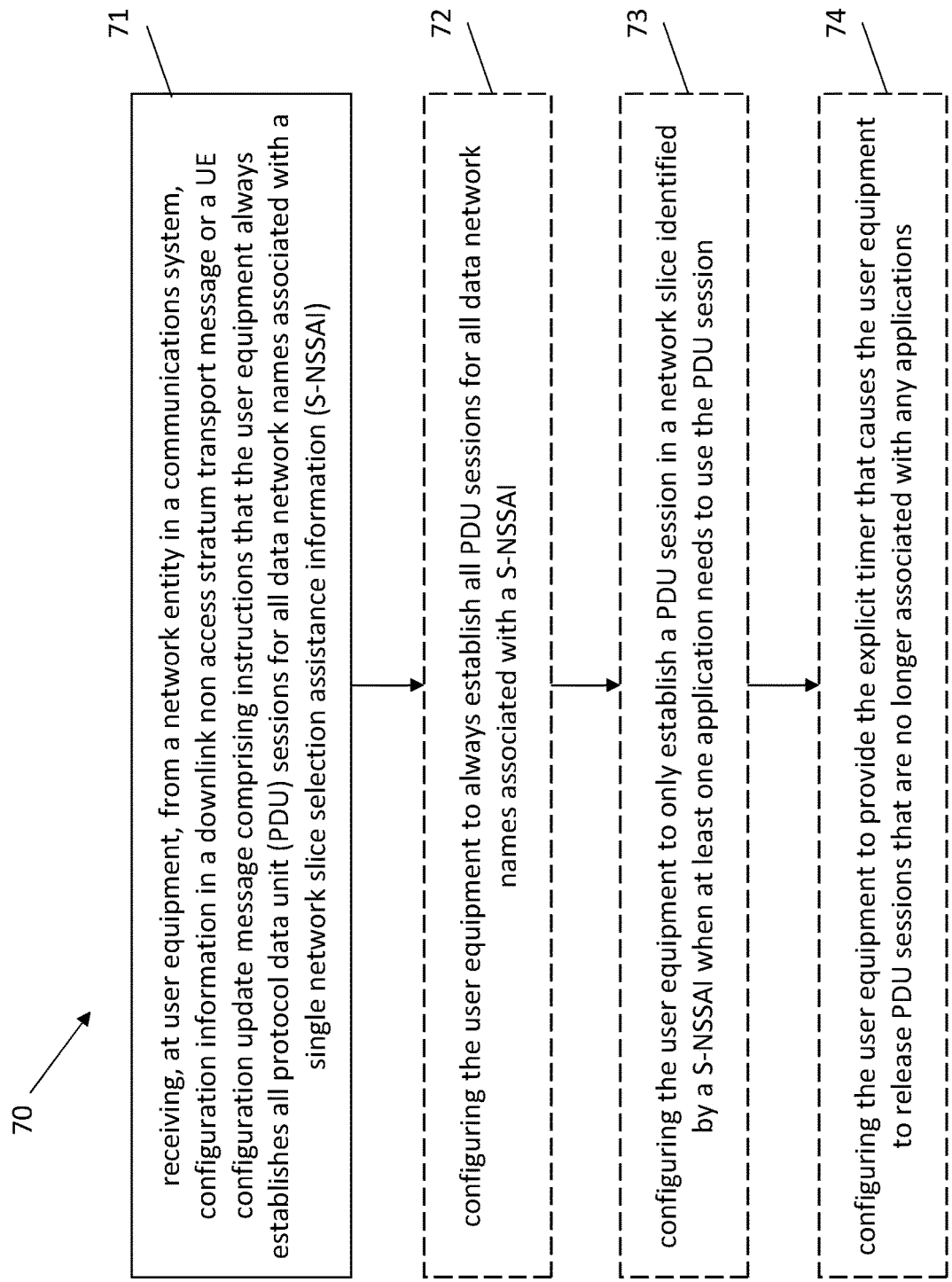
Figure 13:
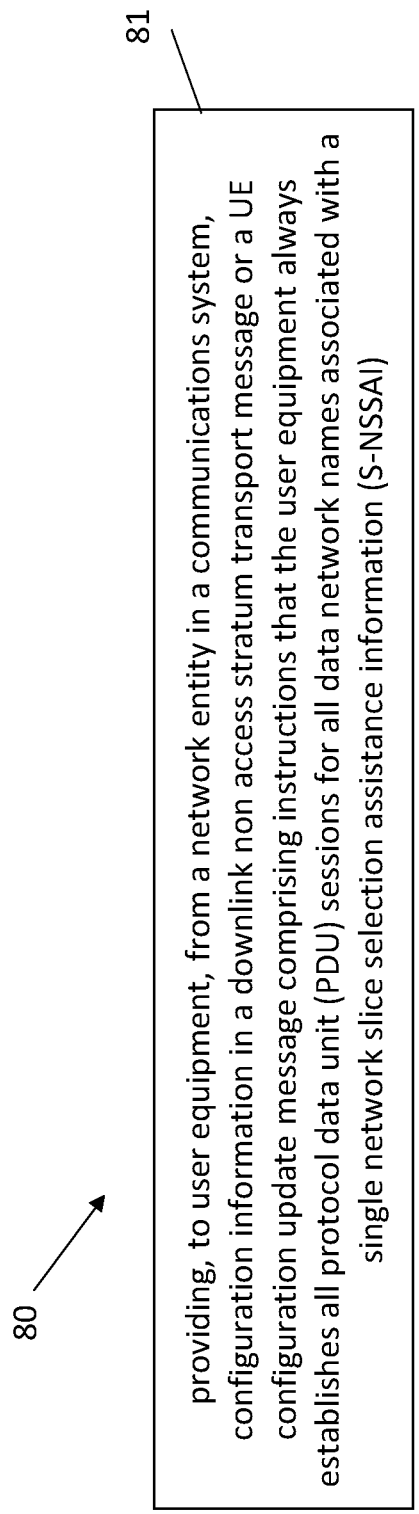

Having thus described certain example embodiments of the invention in general terms, reference will now be made to the accompanying drawings, which are not necessarily drawn to scale, and wherein:

FIG. 1 depicts an example system environment in which implementations in accordance with an example embodiment of the present invention may be performed;

FIG. 2 is a block diagram of a core network apparatus configured in accordance with an example embodiment of the present disclosure;

FIG. 3 illustrates example transmissions between a user equipment and a communication system for registering with a network slice in accordance with an example embodiment of the present disclosure;

FIG. 4 illustrates example transmissions between a network entity and a user equipment in a communication system for updating user equipment configuration for a network slice in accordance with an example embodiment of the present disclosure;

FIG. 5 illustrates example transmissions between a user equipment and a communication system for configuring user equipment behavior for a network slice in accordance with an example embodiment of the present disclosure;

FIG. 6 illustrates an example workflows of various components of a communication system in accordance with an example embodiment;

FIG. 7 illustrates an example workflows of various components of a communication system in accordance with an example embodiment;

FIG. 8 illustrates an example workflows of various components of a communication system in accordance with an example embodiment;

FIG. 9 illustrates an example workflows of various components of a communication system in accordance with an example embodiment;

FIG. 10 illustrates an example workflows of various components of a communication system in accordance with an example embodiment;

FIG. 11 illustrates an example workflows of various components of a communication system in accordance with an example embodiment;

FIG. 12 illustrates an example workflows of various components of a communication system in accordance with an example embodiment; and FIG. 13 illustrates an example workflows of various components of a communication system in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

Third generation partnership project (3GPP) 5th generation (5G) technology is a next generation of radio systems and network architecture that can deliver extreme broadband and ultra-robust, low latency connectivity. 5G technology improves a variety of telecommunication services offered to the end users, and helps to support massive broadband that delivers gigabytes of bandwidth per second on demand for both the uplink and downlink transmissions. Next generation systems, which utilize the 5G architecture, utilize virtualized radio access network (RAN) functions and core network functions.

Embodiments will be illustrated herein in conjunction with example communication systems and associated techniques for providing data transport in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3rd Generation Partnership Project (3GPP) system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the 3GPP TS 23.501, 3GPP TS 23.502, 3GPP TS 33.501, and 3GPP TR 33.899. Other 3GPP TS/TR documents provide other conventional details that one of ordinary skill in the art will realize. However, while illustrative embodiments are well-suited for implementation associated with the above-mentioned 5G-related 3GPP standards, alternative embodiments are not necessarily intended to be limited to any particular standards.

In a 5G network, network slicing is a concept for running multiple logical networks as virtually independent business operations on a common physical infrastructure. A network slice is considered as an independent virtualized end-to-end network. Currently, standardization efforts are being made on simplifying the way network slices are defined, how user equipment register and deregister with a network slice, and how a protocol data unit (PDU) session is admitted to a network slice. However, under the current 3GPP specifications, enforcing such activities is complex and typically rests with the user equipment, meaning the network operator has little control over user equipment behavior during such activities. While the present disclosure may describe the invention in conjunction with a 5G communications system, the invention also applies to and comprises other networks and network technologies, such as 4G, LTE, 3G, etc. without limitation.

Methods, apparatuses and computer program products are provided in accordance with example embodiments to provide for operator control of user equipment behavior in registering and deregistering with network slices and establishing and releasing PDU sessions in a communication system.

In communications systems, such as a 5G system, a user equipment (UE) may subscribe to one or more network slices. The UE subscription can include several network slices, each identified by network slice selection assistance information (NSSAI). A network slice may therefore be identified by single network slice selection assistance information (S-NSSAI). One or more of these S-NSSAIs may be marked as default S-NSSAIs. A default S-NSSAI may identify a network slice the UE can or should be using if the UE is not requesting any network slice in particular in the requested NSSA, e.g., before it is configured with a Configured NSSAII. Under current standards such as those mentioned herein, and in an instance in which the UE has been configured with a Configured NSSAI, these current standards leave the UE totally free to request any of these based on local logic. As such, there is no constraint on the behavior according to which the UE requests one or more of the Configured NSSAI. Under the current standards, the only mechanism available is for the home public land mobile network (HPLMN) of the UE to configure the UE with a Default configured NSSAI the UE would use when it has not yet received a Configured NSSAI in the Serving PLMN.

However, there are several problems with this approach, which includes that the UE may, at any time, omit to request a S-NSSAI the operator intends the UE to use to, e.g., provide it with essential services or updates. Also, many UEs on the market today are configured to, in such instances, proceed to request all S-NSSAIs in the configured NSSAI without any regard for the actual need, which may mean that, for instance, operators will find no use to deploy network slice-specific Access and Mobility management Functions (AMFs) as all UEs that behave in this way will typically end up in AMFs that support all the S-NSSAIs at the same time. Such a circumstance for the network may mean that only general AMFs are used and must either switch between network slices or be configured for functioning within or between multiple network slices, which can lead to inefficient network messaging, a lack of specialized network slicing, inefficient signaling of NSSAI, and/or the like. For instance, under the current standards and related network/UE configurations, a UE that is configured for a massive internet of things (MIoT) slice and an enhanced mobile broadband (eMBB) slice, will typically or always end up in an AMF that supports both, even if the UE seldom needs to use the eMBB (e.g., only when the UE needs its software to be updated). AMFs specific for MIoT have been one of the main drives of network slicing and, e.g., in an evolved packet system (EPS) of Dedicated core networks, were defined to, e.g., support mobility management entities (MMES) devoted to internet of things (IoT) technology and connectivity mainly or only (e.g., MMEs that manage small amounts of data and/or seldom connect a large number of devices, or that support small data transmission on a control plane).

According to the current standards, if the UE has access to or is configured for access to greater than or equal to a particular number of network slices, such as greater than eight network slices, then the UE can or will apply a logic that is outside of network operator control in deciding which of the eight or more network slices not to request.

Conversely, some UEs may decide to only request one network slice in association with an application and then abandon the requested network slice after the application that needed it has stopped using it. Some operators may want to minimize this type of behavior if the applications are launched and released rather frequently. Operators therefore have no way to enforce a network slice registration/deregistration behavior for UEs or UE behavior regarding associating a PDU session with a network slice. According to the current relevant standards, an operator that only deploys AMFs that serve all network slices at the same time, for instance, may indeed want to enforce all UEs to minimize the UE joining and leaving network slices by registration procedures, as indeed they would be at least quasi pointless in their network—unless, for instance, some of the network slices also have a limitation on the number of UEs connected, require extra authentication and authorization for a UE to connect, or have a default Access Point Name (APN).

As such, according to the current relevant standards, the operator typically have no way to configure UE, e.g., with a hysteresis timer, to cause the UE to determine when to abandon a network slice after the last application that used that network slice stops doing so. If applications, e.g., operated by a UE, join and leave network slices frequently (e.g., join and leave a network slice greater than a certain number of times per unit time) this may cause undesirable signaling load.

As such, described herein are methods, apparatuses, and computer program products to resolve some or all of the described limitations of the current relevant standards, and/or other limitations of the current relevant standards. Such methods, apparatuses, and computer program products are thus described that allow the operators control UE behavior. By allowing control, by the network operator, network slice operator, APN operator, AMF operator, or another network entity, of UE behavior, may allow operators to tune UE behavior in their network, network slice, or network entity in a manner tailored to their deployment and in a manner that may minimize signaling load and reduce unnecessary bandwidth being dedicated to such signaling and registration/deregistration and other such activities. A similar approach can also be adopted inside a network slice to control which PDU sessions shall be established and which can be established or should be established, e.g., only upon an application requesting them. According to the current relevant standards, there is currently no requirement for a UE to establish PDU sessions with a Data Network Name (DNN), e.g., only when an application needs it, if these are configured in a UE route selection policy (URSP). Said otherwise, the described approach allows operators to control UE behavior in forming a Requested NSSAI and in requesting PDU sessions inside a network slice.

In some embodiments, a network entity and/or a UE can be configured such that an operator of the network can control UE behavior. In some embodiments, in addition to being capable of providing the Configured NSSAI and URSP to the UE, the network entity may also provide the UE with configuration information that instructs the UE to reconfigure the UE to control the behavior in forming the Requested NSSAI, and also in establishing PDU sessions. This information may be on a per S-NSSAI basis, on a per DNN basis, and/or a global basis.

In some embodiments, in order to control the S-NSSAI the UE includes in a requested NSSAI message, the PLMN may instruct the UE, in a Registration Accept message or in a UE configuration update, or configure the UE by any other means to, request all S-NSSAIs in the Configured NSSAI. In some embodiments, by default, the UE may be configured to request any S-NSSAIs of a Serving PLMN which maps to S-NSSAIs in the Default configured NSSAI.

In some embodiments, the operator may instruct the UE, e.g., in a Registration Accept message, UE configuration update, or any other suitable means, to always at least request a well-specified subset of the S-NSSAIs in the Configured NSSAI. In some embodiments, these may be at least the default S-NSSAIs that the HPLMN provides. In some embodiments, this subset can be identified by flags associated to each S-NSSAI provided to the UE in the configured NSSAI, or in the Default Configured NSSAI.

In some embodiments, the operator may instruct the UE, e.g., in a Registration Accept message, UE configuration update, or any other suitable means, to only request S-NSSAIs which have Active applications.

In some embodiments, the operator may instruct the UE, e.g., in a Registration Accept message, UE configuration update, or any other suitable means, to only request a S-NSSA if active applications are using it. In some embodiments, if the UE is configured to only request a S-NSSA if active applications are using it, the UE or a network entity may provide an explicit timer that causes the UE to release a network slice that is no longer used by any application, e.g., by excluding it in the next Requested NSSAI, so the operator can implement a sort of hysteresis.

In some embodiments, in order to control the PDU session establishment and release, the network may configure the UE, e.g., in a UE configuration update providing URSP or any other URSP configuration means, to always establish all PDU sessions associated to a S-NSSAI.

In some embodiments, in order to control the UE with regard to PDU session establishment and release from a network slice, the network may configure the UE to, e.g., by default, establish a specific PDU session or subset of PDU sessions. In some embodiments, the network entity may communicate instructions for the UE to default to establishing a specific PDU session or subset of PDU sessions in response to a message from a network entity that is identified explicitly in UE configuration information. For instance, the UE configuration information may be provided in the URSP by associating a flag to a DNN associated to a S-NSSAI. In some embodiments, the serving PLMN may use a local policy or the default DNN for the S-NSSAI provided by the HPLMN, if any.

In some embodiments, in order to control the UE with regard to PDU session establishment and release from a network slice, the network may configure the UE to only establish a PDU session when at least one application needs to use it, e.g., no PDU session is established unless one application needs to use it and it is launched on the UE and it has requested to use data transfer capabilities for the PDU session DNN. In some embodiments, in order to control the UE with regard to PDU session establishment and release from a network slice, the network may configure the UE, in an instance in which the UE is configured to only establish a PDU session if active applications are using it, to provide an explicit timer that causes the UE to release a PDU session that is no longer associated to any application so the operator can implement a sort of hysteresis. In some embodiments, the network may be configured to cause the UE to have the necessary connectivity in place, that it is served optimally according to network policies, and that the right signaling load can be controlled by the network.

FIG. 1 depicts an example communication system environment in which implementations in accordance with an example embodiment of the present invention may be performed. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, the system environment includes one or more user equipment (UE) 102 configured to communicate wirelessly, such as via an access network, with a network 106. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems. System environment 100, as depicted in FIG. 1, also includes one or more access points 104a and 104b, such as base stations, including but not limited to node Bs, evolved Node Bs (eNB), or the like. A cellular access point, such as a base station, may define and service one or more cells. The access points may, in turn, be in communication with a network 106, such as a core network via a gateway, such that the access points establish cellular radio access networks by which the user equipment 102 may communicate with the network. The system environment 100 of FIG. 1 may include a plurality of different cellular radio access cells and/or networks or parts of such networks including, for example, a 5G radio access network, an LTE (Long-Term Evolution) radio access network, a UMTS (universal mobile telecommunications system) radio access network, etc. In some example implementations, equipment and other infrastructure associated with multiple different cellular radio access networks may be located at or near structures and/or other equipment associated with a particular access point, such as access point 104a and 104b.

In some implementations of system environment 100, the cellular radio access networks serviced by access points 104a, 104b, and any other access points in a given area are identical, in the sense that as user equipment 102 moves from an area serviced by access point 104a to an area serviced by access point 104b. The user equipment 102 is able to access the network 106 via a radio access network provided across access points. Although not shown, the system may also include a controller associated with one or more of the cellular access points, such as, base stations, for example, so as to facilitate operation of the access points and management of the user equipment 102 in communication therewith. As shown in FIG. 1, a system may also include one or more wireless local area networks (WLANs), each of which may be serviced by a WLAN access point 108 configured to establish wireless communications with the user equipment. As such, the user equipment may communicate with the network via a WLAN access point as shown in solid lines in FIG. 1, or, alternatively, via a cellular access point as shown in dashed lines. The radio access networks as well as the core networks may consist of additional network elements as routers, switches, servers, gateways, and/or controllers.

In this regard, the implementation and/or allocation of a network slice within a network environment can be accomplished by an apparatus 200 as depicted in FIG. 2. The apparatus may be embodied by and/or incorporated into one or more UEs, such as user equipment 102, or any of the other devices discussed with respect to FIG. 1, such as access points 104a and/or 104b, one or more of WLAN access points 108, and/or devices that may be incorporated or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, including but not limited to a smartphone, a tablet computer, or the like, for example.

In some embodiments, the system environment 100 may include one or more of the following network functions (NF): Authentication Server Function (AUSF), Access and Mobility Management Function (AMF), Data Network (DN), e.g. operator services, Internet access or 3rd party services, Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), UE radio Capability Management Function (UCMF), Application Function (AF), User Equipment (UE), Next Generation-Radio Access Network (NG-RAN), 5G-Equipment Identity Register (5G-EIR), Network Data Analytics Function (NWDAF), and Charging Function (CHF). The system environment may further comprise the following network entities: Service Communication Proxy (SCP) and Security Edge Protection Proxy (SEPP).

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means including processing circuitry, such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 may optionally include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Provided hereinbelow, are example transmissions between UE and a network entity. The below example transmissions provide the foreseen steps or messaging needed. Information between "[ ]" is optional and may be included if, e.g., at the same time as when the UE behavior is configured, the UE is provided with configured NSSAI and/or URSP.

FIG. 3 illustrates example transmissions between UE and an AMF of a communication system for registering the UE with a network slice. In some embodiments, the UE can send a REGISTRATION REQUEST message to the AMF, at 1. The AMF, or another suitable network entity of the communication system can determine, e.g., based on local policy or information received from the UDM, the desired UE behavior for the Requested NSSAI formation and/or for DNN establishment. As such, as part of the consideration, by the AMF or other network entity, about whether the UE should be registered with the communication system (e.g., core network, network slice, requested network slice, AMF, etc.), the AMF or other network entity can determine if the UE is configured to provide control over certain aspects of registration/deregistration to the network entity (e.g., AMF). Then, if the UE is so configured, the network entity (e.g., AMF) can return a REGISTRATION ACCEPT message to the UE, at 2. In some embodiments, even if the UE is not so configured, the network entity (e.g., AMF) can return a REGISTRATION ACCEPT message to the UE.

In some embodiments, the REGISTRATION ACCEPT message can include Configured NSSAI, UE behavior assistance information, and/or the like. In some embodiments, the network entity (e.g., AMF) can transmit such a REGIS- TRATION ACCEPT message (e.g., comprising UE behavior assistance information) to the UE such that the UE can be configured to follow the network entity instructions for control of UE behavior during registration/deregistration and/or PDU session establishment/release. Once the UE receives the REGISTRATION ACCEPT message, the UE can apply the new behavior provided by the network in the UE behavior assistance information, for example, or provide otherwise. In some embodiments, the UE behavior assistance information can provide instructions that the UE be configured to request all S-NSSAIs in the Configured NSSAI. In some embodiments, the UE behavior assistance information can provide instructions that the UE be configured to, by default, request any S-NSSAIs of a Serving PLMN which maps to S-NSSAIs in the Default configured NSSAI. In some embodiments, the UE behavior assistance information can provide instructions that the UE be configured to always at least request a well-specified subset of the S-NSSAIs in the Configured NSSAI. In some embodiments, the well-specified subset of the S-NSSAIs in the Configured NSSAI can be or comprise at least the default S-NSSAIs that the HPLMN provides. In some embodiments, the well-specified subset can be identified by flags associated with some or each S-NSSAI provided to the UE in the Configured NSSAI or in the Default Configured NSSAI. In some embodiments, the UE behavior assistance information can provide instructions that the UE be configured to only request S-NSSAIs which have active applications associated therewith, e.g., applications operated by the UE. In some embodiments, the UE behavior assistance information can provide instructions that the UE be configured to, if the UE is configured to only request an S-NSSA if active applications are using the network slice, provide an explicit timer that causes the UE to release a network slice that is no longer used by any application, e.g., by excluding the network slice to be released from the next Requested NSSAI, so the operator can implement a sort of hysteresis.

FIG. 4 illustrates example transmissions between UE and an AMF of a communication system for a UE configuration update. In some embodiments, a UE configuration update can be operable to provide for operator control of UE behavior in registering and deregistering with network slices and/or establishing and releasing PDU sessions in the communication system. In some embodiments, the AMF may, based for instance on local policy or information received from the UDM, determine the desired UE behavior for Requested NSSAI formation and/or for DNN establishment, with regard to a particular UE, a particular network slice, globally with regard to the network or communications system, and/or the like. In some embodiments, the AMF may then provide a UE configuration update command message to the UE, at 1. In some embodiments, the UE configuration update command message may comprise Configured NSSAI, URSP, other identifying information regarding the network, network slice, a PDU session, the AMF, and/or the like. In some embodiments, the UE configuration update command message may further comprise UE behavior assistance information, which may be similar to or the same as the UE behavior assistance information described above with regard to FIG. 3.

For instance, a message can be transmitted from a network entity, such as an AMF, that includes a UE behavior assistance information and/or the like. In some embodiments, the network entity (e.g., AMF) can transmit such a message (e.g., comprising UE behavior assistance information) to the UE such that the UE can be configured to follow the network entity instructions for control of UE behavior during establishment and/or release of a PDU session with a network slice. Once the UE receives the message, the UE can apply the new behavior provided by the network in the UE behavior assistance information, for example, or provide otherwise. In some embodiments, the UE behavior assistance information can provide instructions that the UE be configured to request all S-NSSAIs in the Configured NSSAI. In some embodiments, the UE behavior assistance information can provide instructions that the UE be configured to, by default, request any S-NSSAIs of a Serving PLMN which maps to S-NSSAIs in the Default configured NSSAI. In some embodiments, the UE behavior assistance information can provide instructions that the UE be configured to always at least request a well-specified subset of the S-NSSAIs in the Configured NSSAI. In some embodiments, the well-specified subset of the S-NSSAIs in the Configured NSSAI can be or comprise at least the default S-NSSAIs that the HPLMN provides. In some embodiments, the well-specified subset can be identified by flags associated with some or each S-NSSAI provided to the UE in the Configured NSSAI or in the Default Configured NSSAI. In some embodiments, the UE behavior assistance information can provide instructions that the UE be configured to only request S-NSSAIs which have active applications associated therewith, e.g., applications operated by the UE. In some embodiments, the UE behavior assistance information can provide instructions that the UE be configured to, if the UE is configured to only request an S-NSSA if active applications are using the network slice, provide an explicit timer that causes the UE to release a network slice that is no longer used by any application, e.g., by excluding the network slice to be released from the next Requested NSSAI, so the operator can implement a sort of hysteresis.

In some embodiments, the UE behavior assistance information can provide instructions that the UE be configured to always establish all PDU sessions associated with a S-NSSAI. In some embodiments, the UE behavior assistance information can provide instructions that the UE be configured to, by default, establish a specific PDU session or subset of PDU sessions. In some embodiments, the specific PDU session or subset of PDU sessions can be identified explicitly in the UE configuration information or a message comprising the same. In some embodiments, UE configuration information can be provided in a URSP by associating a flag to a DNN associated with a S-NSSAI. In some embodiments, the Serving PLMN may use local policy or the default DNN for the S-NSSAI provided by the HPLMN, if any.

In some embodiments, the UE behavior assistance information can, optionally, be provided in or with a downlink non access stratum transport message, from the network entity, to the user equipment, such as is illustrated at box 3 in FIG. 4. In some other embodiments, the UE behavior assistance information can be, optionally, provided in or with a a UE configuration update message from the network entity to the user equipment. In some embodiments, the UE behavior assistance information can comprise configuration information comprising instructions for the user equipment to request all S-NSSAI of a configured NSSAI or instructions for the user equipment to request all S-NSSAI of a default configured NSSAI. In some embodiments, the registration acceptance or rejection message, the downlink non access stratum transport message, or a UE configuration update message can comprise instructions for the user equipment to always request a subset of S-NSSAIs in the configured NSSAI. In some embodiments, the subset of S-NSSAIs may be indicated explicitly or it is identified by one or more flags associated with each S-NSSAI provided to the user equipment in the configured NSSAI or the default configured NSSAI, wherein said one or more S-NSSAIs are determined by the network based on local policy or based on information received from the subscription information of the user equipment. In some embodiments, the registration acceptance or rejection message, the downlink non access stratum transport message, or the UE configuration update message can comprises instructions for the user equipment to only request S-NSSAIs which have active applications. In some embodiments, the registration acceptance or rejection message, the downlink non access stratum transport message, or the UE configuration update message can comprise instructions for the user equipment to release network slices that are no longer used by any application, thereby excluding released network slices from a next requested NSSAI.

FIG. 5 illustrates example transmissions between UE and a network entity (e.g., an AMF) of a communication system for UE behavior configuration. In some embodiments, a UE configuration update can be operable to provide for operator control of UE behavior in any suitable interaction with the network or network entity, such as the AMF, e.g., in registering and deregistering with network slices and/or establishing and releasing PDU sessions with/from network slices in the communication system. In some embodiments, the AMF may provide UE behavior assistance information according to any suitable means or methods to the UE. In some embodiments, the UE may request, retrieve, or receive UE behavior assistance information from a network entity, such as the AMF, according to any suitable means or methods. In some embodiments, the AMF or UE may, e.g., based on local policy or information received from another network entity such as the UDM, determine the desired UE behavior for Requested NSSAI formation and/or for DNN establishment, with regard to a particular UE, a particular network slice, globally with regard to the network or communications system, and/or the like. In some embodiments, the UE may retrieve or receive from the network entity, and/or the network entity may be configured to send to the UE, UE behavior assistance information along with one or more configured NSSAIs, URSP, other identifying information regarding the network, network slice, a PDU session, and the AMF, and/or the like. In some embodiments, the UE configuration update command message may further comprise UE behavior assistance information, which may be similar to or the same as the UE behavior assistance information described above with regard to FIG. 3.

For instance, the UE behavior assistance information can be operable to cause the UE to be configured to follow the network entity instructions for control of UE behavior during establishment and/or release of a PDU session with a network slice. In some embodiments, the UE can apply the new behavior provided by the network in the UE behavior assistance information, for example, or provided otherwise. In some embodiments, the UE behavior assistance information can provide instructions that the UE be configured to request all S-NSSAIs in the Configured NSSAI. In some embodiments, the UE behavior assistance information can provide instructions that the UE be configured to, by default, request any S-NSSAIs of a Serving PLMN which maps to S-NSSAIs in the Default configured NSSAI. In some embodiments, the UE behavior assistance information can provide instructions that the UE be configured to always at least request a well-specified subset of the S-NSSAIs in the Configured NSSAI. In some embodiments, the well-specified subset of the S-NSSAIs in the Configured NSSAI can be or comprise at least the default S-NSSAIs that the HPLMN provides. In some embodiments, the well-specified subset can be identified by flags associated with some or each S-NSSAI provided to the UE in the Configured NSSAI or in the Default Configured NSSAI. In some embodiments, the UE behavior assistance information can provide instructions that the UE be configured to only request S-NSSAIs which have active applications associated therewith, e.g., applications operated by the UE. In some embodiments, the UE behavior assistance information can provide instructions that the UE be configured to, if the UE is configured to only request an S-NSSA if active applications are using the network slice, provide an explicit timer that causes the UE to release a network slice that is no longer used by any application, e.g., by excluding the network slice to be released from the next Requested NSSAI, so the operator can implement a sort of hysteresis.

In some embodiments, the UE behavior assistance information can provide instructions that the UE be configured to always establish all PDU sessions associated with a S-NSSAI. In some embodiments, the UE behavior assistance information can provide instructions that the UE be configured to, by default, establish a specific PDU session or subset of PDU sessions. In some embodiments, the specific PDU session or subset of PDU sessions can be identified explicitly in the UE configuration information or a message comprising the same. In some embodiments, UE configuration information can be provided in a URSP by associating a flag to a DNN associated with a S-NSSAI. In some embodiments, the Serving PLMN may use local policy or the default DNN for the S-NSSAI provided by the HPLMN, if any.

Referring now to FIG. 6, an example workflow of various components of a communication system are illustrated in accordance with example embodiments, such as a UE, an AMF, a V-NSSF, a SMF, or other components previously described, e.g., in conjunction with other figures. Referring now to FIG. 6, a method 10 is illustrated that can be carried out by one or more of the described entities that comprise mean, such as the processor 202 and communication interface 208 or the like, for receiving, at a network entity of a communications system, from user equipment, a registration request message, at 11. In some embodiments, the method 10 can comprise, in an instance in which the registration request message comprises information indicating the user equipment supports or requires the configuration of network-controlled slice selection behavior, transmitting, in response to receiving the registration request message, from the network entity, to the user equipment, a registration acceptance or rejection message comprising configuration information including instructions for the user equipment to request all single network slice selection assistance information (S-NSSAI) of a configured network slice selection assistance information (NSSAI) or instructions for the user equipment to request all S-NSSAI of a default configured NSSAI, at 12. In some embodiments, the method 10 can, optionally, comprise providing, by a downlink non access stratum transport message or a UE configuration update message, from the network entity, to the user equipment, configuration information comprising instructions for the user equipment to request all S-NSSAI of a configured NSSAI or instructions for the user equipment to request all S-NSSAI of a default configured NSSAI, at 13.

Referring now to FIG. 7, an example workflow of various components of a communication system are illustrated in accordance with example embodiments, such as a UE or other components previously described, e.g., in conjunction with other figures. Referring now to FIG. 7, a method 20 is illustrated that can be carried out by one or more of the described entities that comprise mean, such as the processor 202 and communication interface 208 or the like, for receiving, at user equipment, from a network entity of a communications system, in response to a registration request message previously transmitted from the user equipment to the network entity, the registration request message comprising information indicating the user equipment supports or requires the configuration of network-controlled slice selection behavior, a registration acceptance or rejection message comprising instructions for the user equipment to request all single network slice selection assistance information (S-NSSAI) of a configured network slice selection assistance information (NSSAI) or instructions for the user equipment to request all S-NSSAI of a default configured NSSAI, at 21. In some embodiments, the method 20 can further comprise receiving a downlink non access stratum transport message or a UE configuration update message comprising configuration information including instructions for the user equipment to request all S-NSSAI of a configured NSSAI or instructions for the user equipment to request all S-NSSAI of a default configured NSSAI, at 22. In some embodiments, the method 20 can, optionally, further comprise configuring the user equipment to request, while it is in the communications systems, all S-NSSAI of the configured NSSAI or the default configured NSSAI, at 23. In some embodiments, the method 20 can, optionally, further comprise configuring the user equipment to always request a subset of S-NSSAIs in the configured NSSAI, at 24.

Referring now to FIG. 8, an example workflow of various components of a communication system are illustrated in accordance with example embodiments, such as a UE or other components previously described, e.g., in conjunction with other figures. Referring now to FIG. 8, a method 30 is illustrated that can be carried out by one or more of the described entities that comprise mean, such as the processor 202 and communication interface 208 or the like, for receiving, at user equipment, from a network entity of a communications system, in response to a registration request message previously transmitted from the user equipment to the network entity, the registration request message comprising information indicating the user equipment supports or requires the configuration of network-controlled slice selection behavior, a registration acceptance or rejection message comprising instructions for the user equipment to request all single network slice selection assistance information (S-NSSAI) of a configured network slice selection assistance information (NSSAI) or instructions for the user equipment to request all S-NSSAI of a default configured NSSAI, at 31. In some embodiments, the method 30 can further comprise receiving a downlink non access stratum transport message or a UE configuration update message comprising configuration information including instructions for the user equipment to request all S-NSSAI of a configured NSSAI or instructions for the user equipment to request all S-NSSAI of a default configured NSSAI, at 32. In some embodiments, the method 30 can, optionally, further comprise configuring the user equipment to request, while it is in the communications systems, all S-NSSAI of the configured NSSAI or the default configured NSSAI, at 33. In some embodiments, the method 30 can, optionally, further comprise configuring the user equipment to only request S-NSSAIs which have active applications, at 34.

Referring now to FIG. 9, an example workflow of various components of a communication system are illustrated in accordance with example embodiments, such as a UE or other components previously described, e.g., in conjunction with other figures. Referring now to FIG. 9, a method 40 is illustrated that can be carried out by one or more of the described entities that comprise mean, such as the processor 202 and communication interface 208 or the like, for receiving, at user equipment, from a network entity of a communications system, in response to a registration request message previously transmitted from the user equipment to the network entity, the registration request message comprising information indicating the user equipment supports or requires the configuration of network-controlled slice selection behavior, a registration acceptance or rejection message comprising instructions for the user equipment to request all single network slice selection assistance information (S-NSSAI) of a configured network slice selection assistance information (NSSAI) or instructions for the user equipment to request all S-NSSAI of a default configured NSSAI, at 41. In some embodiments, the method 40 can further comprise receiving a downlink non access stratum transport message or a UE configuration update message comprising configuration information including instructions for the user equipment to request all S-NSSAI of a configured NSSAI or instructions for the user equipment to request all S-NSSAI of a default configured NSSAI, at 42. In some embodiments, the method 40 can, optionally, further comprise configuring the user equipment to request, while it is in the communications systems, all S-NSSAI of the configured NSSAI or the default configured NSSAI, at 43. In some embodiments, the method 40 can, optionally, further comprise configuring the user equipment to release, based upon a value of said timer, network slices that are no longer used by any application and excluding the released network slice from the next requested NSSAI, at 44.

Referring now to FIG. 10, an example workflow of various components of a communication system are illustrated in accordance with example embodiments, such as a UE or other components previously described, e.g., in conjunction with other figures. Referring now to FIG. 10, a method 50 is illustrated that can be carried out by one or more of the described entities that comprise mean, such as the processor 202 and communication interface 208 or the like, for receiving, at user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI), at 51. In some embodiments, the method 50 can, optionally, further comprise configuring the user equipment to always establish all PDU sessions for all data network names associated with a S-NSSAI, at 52. In some embodiments, the method 50 can, optionally, further comprise configuring the user equipment to, by default, establish the specific PDU session or the subset of PDU sessions, associated with a S-NSSAI, if identified by a data network name associated with a flag, at 53.

Referring now to FIG. 11, an example workflow of various components of a communication system are illustrated in accordance with example embodiments, such as a UE or other components previously described, e.g., in conjunction with other figures. Referring now to FIG. 11, a method 60 is illustrated that can be carried out by one or more of the described entities that comprise mean, such as the processor 202 and communication interface 208 or the like, for receiving, at user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI), at 61. In some embodiments, the method 60 can, optionally, further comprise configuring the user equipment to always establish all PDU sessions for all data network names associated with a S-NSSAI, at 62. In some embodiments, the method 60 can, optionally, further comprise configuring the user equipment to at least establish a PDU session in a network slice identified by a S-NSSAI when no DNN is configured for the S-NSSAI, at 63.

Referring now to FIG. 12, an example workflow of various components of a communication system are illustrated in accordance with example embodiments, such as a UE or other components previously described, e.g., in conjunction with other figures. Referring now to FIG. 12, a method 70 is illustrated that can be carried out by one or more of the described entities that comprise mean, such as the processor 202 and communication interface 208 or the like, for receiving, at user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI), at 71. In some embodiments, the method 70 can, optionally, further comprise configuring the user equipment to always establish all PDU sessions for all data network names associated with a S-NSSAI, at 72. In some embodiments, the method 70 can, optionally, further comprise configuring the user equipment to only establish a PDU session in a network slice identified by a S-NSSAI when at least one application needs to use the PDU session, at 73. In some embodiments, the method 70 can, optionally, further comprise configuring the user equipment to provide the explicit timer that causes the user equipment to release PDU sessions that are no longer associated with any applications, at 74.

Referring now to FIG. 13, an example workflow of various components of a communication system are illustrated in accordance with example embodiments, such as a UE or other components previously described, e.g., in conjunction with other figures. Referring now to FIG. 13, a method 80 is illustrated that can be carried out by one or more of the described entities that comprise mean, such as the processor 202 and communication interface 208 or the like, for providing, to user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI), at 81.

As described above, the method, apparatus and computer program product of an example embodiment therefore provide an enforcement mechanism for the maximum number of PDU sessions per network slice in a communication system. In some embodiments, the method, apparatus and computer program product provide the enforcement mechanism in a manner that emphasizes amongst the UEs having PDU sessions.

As described above, FIGS. 6-13 are flowcharts of various methods that can be carried out by, e.g., the apparatus 200, and/or according to a computer program product, according to example embodiments of the disclosure. It will be understood that each block of the flowchart, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as, e.g., in conjunction with the communications flowcharts of FIGS. 3-5 or as part of the system of FIG. 1. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

As such, described herein are methods, apparatuses and computer program products are provided in accordance with example embodiments to provide for operator control of user equipment behavior in registering and deregistering with network slices and establishing and releasing PDU sessions in a communication system.

In one example embodiment, a method is provided that includes receiving, at a network entity of a communications system, from user equipment, a registration request message; in an instance in which the registration request message comprises information indicating the user equipment supports or requires the configuration of network-controlled slice selection behavior, transmitting, in response to receiving the registration request message, from the network entity, to the user equipment, a registration acceptance or rejection message comprising configuration information including instructions for the user equipment to request all single network slice selection assistance information (S-NSSAI) of a configured network slice selection assistance information (NSSAI) or instructions for the user equipment to request all S-NSSAI of a default configured NSSAI; and providing, by a downlink non access stratum transport message or a UE configuration update message, from the network entity, to the user equipment, configuration information comprising instructions for the user equipment to request all S-NSSAI of a configured NSSAI or instructions for the user equipment to request all S-NSSAI of a default configured NSSAI. In some embodiments, the registration acceptance or rejection message or the downlink non access stratum transport or a UE configuration update message comprises instructions for the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI, wherein said one or more S-NSSAIs are determined by the network based on local policy or based on information received from the subscription information of the user equipment. In some embodiments, the registration acceptance or rejection message or the downlink non access stratum transport or a UE configuration update message comprises instructions for the user equipment to only request S-NSSAIs which have active applications. In some embodiments, the registration acceptance or rejection message or the downlink non access stratum transport or a UE configuration update message comprises instructions for the user equipment to release network slices that are no longer used by any application, thereby excluding released network slices from a next requested NSSAI.

According to another embodiment, a method can be carried out that includes receiving, at user equipment, from a network entity of a communications system, in response to a registration request message previously transmitted from the user equipment to the network entity, the registration request message comprising information indicating the user equipment supports or requires the configuration of network-controlled slice selection behavior, a registration acceptance or rejection message comprising instructions for the user equipment to request all single network slice selection assistance information (S-NSSAI) of a configured network slice selection assistance information (NSSAI) or instructions for the user equipment to request all S-NSSAI of a default configured NSSAI; receiving a downlink non access stratum transport message or a UE configuration update message comprising configuration information including instructions for the user equipment to request all S-NSSAI of a configured NSSAI or instructions for the user equipment to request all S-NSSAI of a default configured NSSAI; and configuring the user equipment to request, while it is in the communications systems, all S-NSSAI of the configured NSSAI or the default configured NSSAI. In some embodiments, the registration acceptance or rejection message or downlink non access stratum transport message or a UE configuration update message comprises instructions for the user equipment to always request a subset of S-NSSAIs in the configured NSSAI, the method further comprising: configuring the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI. In some embodiments, the registration acceptance or rejection message or downlink non access stratum transport message or a UE configuration update message comprises instructions for the user equipment to only request S-NSSAIs which have active applications, the method further comprising: configuring the user equipment to only request S-NSSAIs which have active applications. In some embodiments, the registration acceptance or rejection message downlink non access stratum transport message or a UE configuration update message comprises a timer configured to cause the user equipment to release network slices that are no longer used by any application, thereby excluding released network slices from a next requested NSSAI, the method further comprising: configuring the user equipment to release, based upon a value of said timer, network slices that are no longer used by any application and excluding the released network slice from the next requested NSSAI.

According to another embodiment, an apparatus can be provided that comprises at least one processor and at least one memory including computer program code for one or more programs, the at least one memory and the computer program code configured to, with the at least one processor, cause the apparatus at least to: receive, at the apparatus, from user equipment, a registration request message; in an instance in which the registration request message comprises information indicating the user equipment supports or requires the configuration of network-controlled slice selection behavior, transmit, in response to receiving the registration request message, from the apparatus, to the user equipment, a registration acceptance or rejection message comprising configuration information including instructions for the user equipment to request all single network slice selection assistance information (S-NSSAI) of a configured network slice selection assistance information (NSSAI) or instructions for the user equipment to request all S-NSSAI of a default configured NSSAI; and provide, by a downlink non access stratum transport message or a UE configuration update message, from the apparatus, to the user equipment, configuration information comprising instructions for the user equipment to request all S-NSSAI of a configured NSSAI or instructions for the user equipment to request all S-NSSAI of a default configured NSSAI. In some embodiments, the registration acceptance or rejection message or the downlink non access stratum transport or a UE configuration update message comprises instructions for the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI, wherein said one or more S-NSSAIs are determined by the network based on local policy or based on information received from the subscription information of the user equipment. In some embodiments, the registration acceptance or rejection message or the downlink non access stratum transport or a UE configuration update message comprises instructions for the user equipment to only request S-NSSAIs which have active applications. In some embodiments, the registration acceptance or rejection message or the downlink non access stratum transport or a UE configuration update message comprises instructions for the user equipment to release network slices that are no longer used by any application, thereby excluding released network slices from a next requested NSSAI.

According to still another embodiment, an apparatus can be provided that comprises at least one processor and at least one memory including computer program code for one or more programs, the at least one memory and the computer program code configured to, with the at least one processor, cause the apparatus at least to: receive, at the apparatus, from a network entity of a communications system, in response to a registration request message previously transmitted from the apparatus to the network entity, the registration request message comprising information indicating the apparatus supports or requires the configuration of network-controlled slice selection behavior, a registration acceptance or rejection message comprising instructions for the apparatus to request all single network slice selection assistance information (S-NSSAI) of a configured network slice selection assistance information (NSSAI) or instructions for the apparatus to request all S-NSSAI of a default configured NSSAI; receive a downlink non access stratum transport message or a UE configuration update message comprising configuration information including instructions for the apparatus to request all S-NSSAI of a configured NSSAI or instructions for the apparatus to request all S-NSSAI of a default configured NSSAI; and configure the apparatus to request, while the apparatus is in the communications systems, all S-NSSAI of the configured NSSAI or the default configured NSSAI. In some embodiments, the registration acceptance message comprises instructions for the apparatus to always request a subset of S-NSSAIs in the configured NSSAI, and wherein the at least one memory and the computer program code are configured to, with the at least one processor, to further: configuring the apparatus to always request a subset of S-NSSAIs in the configured NSSAI. In some embodiments, the subset of S-NSSAIs is identified by one or more flags associated with each S-NSSAI provided to the apparatus in the configured NSSAI or the default configured NSSAI. In some embodiments, the registration acceptance or rejection message or downlink non access stratum transport message or a UE configuration update message comprises instructions for the apparatus to only request S-NSSAIs which have active applications, and wherein the at least one memory and the computer program code are configured to, with the at least one processor, to further: configure the apparatus to only request S-NSSAIs which have active applications. In some embodiments, the registration acceptance or rejection message downlink non access stratum transport message or a UE configuration update message comprises a timer configured to cause the apparatus to release network slices that are no longer used by any application, thereby excluding released network slices from a next requested NSSAI, and wherein the at least one memory and the computer program code are configured to, with the at least one processor, to further: configuring the apparatus to release, based upon a value of said timer, network slices that are no longer used by any application and excluding the released network slice from the next requested NSSAI.

According to yet another embodiment, an apparatus can be provided that comprises means for receiving, at a network entity of a communications system, from user equipment, a registration request message; means for, in an instance in which the registration request message comprises information indicating the user equipment supports or requires the configuration of network-controlled slice selection behavior, transmitting, in response to receiving the registration request message, from the network entity, to the user equipment, a registration acceptance or rejection message comprising configuration information including instructions for the user equipment to request all single network slice selection assistance information (S-NSSAI) of a configured network slice selection assistance information (NSSAI) or instructions for the user equipment to request all S-NSSAI of a default configured NSSAI; and means for providing, by a downlink non access stratum transport message or a UE configuration update message, from the network entity, to the user equipment, configuration information comprising instructions for the user equipment to request all S-NSSAI of a configured NSSAI or instructions for the user equipment to request all S-NSSAI of a default configured NSSAI. In some embodiments, the registration acceptance or rejection message or the downlink non access stratum transport or a UE configuration update message comprises instructions for the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI, wherein said one or more S-NSSAIs are determined by the network based on local policy or based on information received from the subscription information of the user equipment. In some embodiments, the registration acceptance or rejection message or the downlink non access stratum transport or a UE configuration update message comprises instructions for the user equipment to only request S-NSSAIs which have active applications. In some embodiments, the registration acceptance or rejection message or the downlink non access stratum transport or a UE configuration update message comprises instructions for the user equipment to release network slices that are no longer used by any application, thereby excluding released network slices from a next requested NSSAI.

According to still another embodiment, an apparatus can be provided that comprises means for receiving, at user equipment, from a network entity of a communications system, in response to a registration request message previously transmitted from the user equipment to the network entity, the registration request message comprising information indicating the user equipment supports or requires the configuration of network-controlled slice selection behavior, a registration acceptance or rejection message comprising instructions for the user equipment to request all single network slice selection assistance information (S-NSSAI) of a configured network slice selection assistance information (NSSAI) or instructions for the user equipment to request all S-NSSAI of a default configured NSSAI; means for receiving a downlink non access stratum transport or a UE configuration update message message comprising configuration information including instructions for the user equipment to request all S-NSSAI of a configured NSSAI or instructions for the user equipment to request all S-NSSAI of a default configured NSSAI; and means for configuring the user equipment to request, while it is in the communications systems, all S-NSSAI of the configured NSSAI or the default configured NSSAI. In some embodiments, the registration acceptance or rejection message or downlink non access stratum transport message or a UE configuration update message comprises instructions for the user equipment to always request a subset of S-NSSAIs in the configured NSSAI, the apparatus further comprising: means for configuring the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI. In some embodiments, the registration acceptance or rejection message or downlink non access stratum transport message or a UE configuration update message comprises instructions for the user equipment to only request S-NSSAIs which have active applications, the apparatus further comprising: means for configuring the user equipment to only request S-NSSAIs which have active applications. In some embodiments, the registration acceptance or rejection message downlink non access stratum transport message or a UE configuration update message comprises a timer configured to cause the user equipment to release network slices that are no longer used by any application, thereby excluding released network slices from a next requested NSSAI, the apparatus further comprising: means for configuring the user equipment to release, based upon a value of said timer, network slices that are no longer used by any application and excluding the released network slice from the next requested NSSAI.

According to another embodiment, a computer program product can be provided that comprises at least one non-transitory computer-readable storage medium having computer-executable program code instructions stored therein, the computer-executable program code instructions comprising program code instructions configured, upon execution, to: receive, at a network entity of a communications system, from user equipment, a registration request message; in an instance in which the registration request message comprises information indicating the user equipment supports or requires the configuration of network-controlled slice selection behavior, transmit, in response to receiving the registration request message, from the network entity, to the user equipment, a registration acceptance or rejection message comprising configuration information including instructions for the user equipment to request all single network slice selection assistance information (S-NSSAI) of a configured network slice selection assistance information (NSSAI) or instructions for the user equipment to request all S-NSSAI of a default configured NSSAI; and provide, by a downlink non access stratum transport message or a UE configuration update message, from the network entity, to the user equipment, configuration information comprising instructions for the user equipment to request all S-NSSAI of a configured NSSAI or instructions for the user equipment to request all S-NSSAI of a default configured NSSAI. In some embodiments, the registration acceptance or rejection message or the downlink non access stratum transport or a UE configuration update message comprises instructions for the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI, wherein said one or more S-NSSAIs are determined by the network based on local policy or based on information received from the subscription information of the user equipment. In some embodiments, the registration acceptance or rejection message or the downlink non access stratum transport or a UE configuration update message comprises instructions for the user equipment to only request S-NSSAIs which have active applications. In some embodiments, the registration acceptance or rejection message or the downlink non access stratum transport or a UE configuration update message comprises instructions for the user equipment to release network slices that are no longer used by any application, thereby excluding released network slices from a next requested NSSAI.

According to still another embodiment, a computer program product comprising at least one non-transitory computer-readable storage medium having computer-executable program code instructions stored therein, the computer-executable program code instructions comprising program code instructions configured, upon execution, to: receive, at user equipment, from a network entity of a communications system, in response to a registration request message previously transmitted from the user equipment to the network entity, the registration request message comprising information indicating the user equipment supports or requires the configuration of network-controlled slice selection behavior, a registration acceptance or rejection message comprising instructions for the user equipment to request all single network slice selection assistance information (S-NSSAI) of a configured network slice selection assistance information (NSSAI) or instructions for the user equipment to request all S-NSSAI of a default configured NSSAI; receive a downlink non access stratum transport message or a UE configuration update message comprising configuration information including instructions for the user equipment to request all S-NSSAI of a configured NSSAI or instructions for the user equipment to request all S-NSSAI of a default configured NSSAI; and configure the user equipment to request, while it is in the communications systems, all S-NSSAI of the configured NSSAI or the default configured NSSAI. In some embodiments, the registration acceptance or rejection message or downlink non access stratum transport message or a UE configuration update message comprises instructions for the user equipment to always request a subset of S-NSSAIs in the configured NSSAI, and wherein the computer-executable program code instructions comprising program code instructions configured, upon execution, to: configure the user equipment to always request a subset of S-NSSAIs in the configured NSSAI. In some embodiments, the subset of S-NSSAIs is identified by one or more flags associated with each S-NSSAI provided to the user equipment in the configured NSSAI or the default configured NSSAI. In some embodiments, the registration acceptance or rejection message or downlink non access stratum transport message or a UE configuration update message comprises instructions for the user equipment to only request S-NSSAIs which have active applications, and wherein the computer-executable program code instructions comprising program code instructions configured, upon execution, to: configure the user equipment to only request S-NSSAIs which have active applications. In some embodiments, the registration acceptance or rejection message downlink non access stratum transport message or a UE configuration update message comprises a timer configured to cause the user equipment to release network slices that are no longer used by any application, thereby excluding released network slices from a next requested NSSAI, and wherein the computer-executable program code instructions comprising program code instructions configured, upon execution, to: configure the user equipment to release, based upon a value of said timer, network slices that are no longer used by any application and excluding the released network slice from the next requested NSSAI.

According to still another embodiment, a method can be carried out that comprises receiving, at user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI); and configuring the user equipment to always establish all PDU sessions for all data network names associated with a S-NSSAI. In some embodiments, the configuration information comprises a request that the user equipment, by default, establishes a specific PDU session or subset of PDU sessions, associated with a S-NSSAI, if identified by a data network name associated with a flag, the method further comprising: configuring the user equipment to, by default, establish the specific PDU session or the subset of PDU sessions, associated with a S-NSSAI, if identified by a data network name associated with a flag. In some embodiments, the configuration information comprises a request that the user equipment at least establish a PDU session in a network slice identified by a S-NSSAI when no DNN is configured for the S-NSSAI, the method further comprising: configuring the user equipment to at least establish a PDU session in a network slice identified by a S-NSSAI when no DNN is configured for the S-NSSAI. In some embodiments, the configuration information comprises a request that the user equipment only establish a PDU session in a network slice identified by a S-NSSAI when at least one application needs to use the PDU session, the method further comprising: configuring the user equipment to only establish a PDU session in a network slice identified by a S-NSSAI when at least one application needs to use the PDU session. In some embodiments, the configuration information comprises a request that the user equipment provide an explicit timer that causes the user equipment to release PDU sessions that are no longer associated with any applications, the method further comprising: configuring the user equipment to provide the explicit timer that causes the user equipment to release PDU sessions that are no longer associated with any applications.

According to another embodiment, an apparatus can be provided that comprises at least one processor and at least one memory including computer program code for one or more programs, the at least one memory and the computer program code configured to, with the at least one processor, cause the apparatus at least to: receive, at the apparatus, from a network entity in a communications system, configuration information in a downlink non access stratum transport message or a UE configuration update message comprising instructions that the apparatus always establishes all protocol data unit (PDU) sessions for all data network names associated with a single network slice selection assistance information (S-NSSAI); and configure the apparatus to always establish all PDU sessions for all data network names associated with a S-NSSAI. In some embodiments, the configuration information comprises a request that the apparatus, by default, establishes a specific PDU session or subset of PDU sessions, associated with a S-NSSAI, if identified by a data network name associated with a flag, wherein the at least one memory and the computer program code are further configured to, with the at least one processor, cause the apparatus at least to: configure the apparatus to, by default, establish the specific PDU session or the subset of PDU sessions, associated with a S-NSSAI, if identified by a data network name associated with a flag. In some embodiments, the configuration information comprises a request that the apparatus at least establish a PDU session in a network slice identified by a S-NSSAI when no DNN is configured for the S-NSSAI, wherein the at least one memory and the computer program code are further configured to, with the at least one processor, cause the apparatus at least to: configure the apparatus to at least establish a PDU session in a network slice identified by a S-NSSAI when no DNN is configured for the S-NSSAI. In some embodiments, the configuration information comprises a request that the apparatus only establish a PDU session in a network slice identified by a S-NSSAI when at least one application needs to use the PDU session, wherein the at least one memory and the computer program code are further configured to, with the at least one processor, cause the apparatus at least to: configure the apparatus to only establish a PDU session in a network slice identified by a S-NSSAI when at least one application needs to use the PDU session. In some embodiments, the configuration information comprises a request that the apparatus provide an explicit timer that causes the apparatus to release PDU sessions that are no longer associated with any applications, wherein the at least one memory and the computer program code are further configured to, with the at least one processor, cause the apparatus at least to: configure the apparatus to provide the explicit timer that causes the apparatus to release PDU sessions that are no longer associated with any applications.

According to another embodiment, an apparatus is provided that can comprise means for receiving, at the apparatus, from a network entity in a communications system, configuration information in a downlink non access stratum transport message or a UE configuration update message comprising instructions that the apparatus always establishes all protocol data unit (PDU) sessions for all data network names associated with a single network slice selection assistance information (S-NSSAI); and means for configuring the apparatus to always establish all PDU sessions for all data network names associated with a S-NSSAI. In some embodiments, the configuration information comprises a request that the apparatus, by default, establishes a specific PDU session or subset of PDU sessions, associated with a S-NSSAI, if identified by a data network name associated with a flag, the apparatus further comprising: means for configuring the apparatus to, by default, establish the specific PDU session or the subset of PDU sessions, associated with a S-NSSAI, if identified by a data network name associated with a flag. In some embodiments, the configuration information comprises a request that the apparatus at least establish a PDU session in a network slice identified by a S-NSSAI when no DNN is configured for the S-NSSAI, the apparatus further comprising: means for configuring the apparatus to at least establish a PDU session in a network slice identified by a S-NSSAI when no DNN is configured for the S-NSSAI. In some embodiments, the configuration information comprises a request that the apparatus only establish a PDU session in a network slice identified by a S-NSSAI when at least one application needs to use the PDU session, the apparatus further comprising: means for configuring the apparatus to only establish a PDU session in a network slice identified by a S-NSSAI when at least one application needs to use the PDU session. In some embodiments, the configuration information comprises a request that the apparatus provide an explicit timer that causes the apparatus to release PDU sessions that are no longer associated with any applications, the apparatus further comprising: means for configuring the apparatus to provide the explicit timer that causes the apparatus to release PDU sessions that are no longer associated with any applications.

According to another embodiment, a computer program product can be provided that comprises at least one non-transitory computer-readable storage medium having computer-executable program code instructions stored therein, the computer-executable program code instructions comprising program code instructions configured, upon execution, to: receive, at user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI); and configure the user equipment to always establish all PDU sessions for all data network names associated with a S-NSSAI. In some embodiments, the configuration information comprises a request that the user equipment, by default, establishes a specific PDU session or subset of PDU sessions, associated with a S-NSSAI, if identified by a data network name associated with a flag, wherein the computer-executable program code instructions further comprise program code instructions configured, upon execution, to: configuring the user equipment to, by default, establish the specific PDU session or the subset of PDU sessions, associated with a S-NSSAI, if identified by a data network name associated with a flag. In some embodiments, the configuration information comprises a request that the user equipment at least establish a PDU session in a network slice identified by a S-NSSAI when no DNN is configured for the S-NSSAI, wherein the computer-executable program code instructions further comprise program code instructions configured, upon execution, to: configure the user equipment to at least establish a PDU session in a network slice identified by a S-NSSAI when no DNN is configured for the S-NSSAI. In some embodiments, the configuration information comprises a request that the user equipment only establish a PDU session in a network slice identified by a S-NSSAI when at least one application needs to use the PDU session, wherein the computer-executable program code instructions further comprise program code instructions configured, upon execution, to: configuring the user equipment to only establish a PDU session in a network slice identified by a S-NSSAI when at least one application needs to use the PDU session. In some embodiments, the configuration information comprises a request that the user equipment provide an explicit timer that causes the user equipment to release PDU sessions that are no longer associated with any applications, wherein the computer-executable program code instructions further comprise program code instructions configured, upon execution, to: configuring the user equipment to provide the explicit timer that causes the user equipment to release PDU sessions that are no longer associated with any applications.

According to still another embodiment, a method can be carried out that includes providing, to user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI). In some embodiments, the configuration information comprises a request that the user equipment, by default, establishes a specific PDU session or subset of PDU sessions, associated with a S-NSSAI, if identified by a data network name associated with a flag. In some embodiments, the configuration information comprises a request that the user equipment at least establish a PDU session in a network slice identified by a S-NSSAI when no DNN is configured for the S-NSSAI. In some embodiments, the configuration information comprises a request that the user equipment only establish a PDU session in a network slice identified by a S-NSSAI when at least one application needs to use the PDU session. In some embodiments, the configuration information comprises a request that the user equipment provide an explicit timer that causes the user equipment to release PDU sessions that are no longer associated with any applications.

According to still another embodiment, an apparatus can be provided that comprises at least one processor and at least one memory including computer program code for one or more programs, the at least one memory and the computer program code configured to, with the at least one processor, cause the apparatus at least to: provide, to user equipment, from the apparatus, configuration information in a downlink non access stratum transport or a UE configuration update message comprising instructions that the user equipment always establishes all protocol data unit (PDU) sessions for all data network names associated with a single network slice selection assistance information (S-NSSAI). In some embodiments, the configuration information comprises a request that the apparatus, by default, establishes a specific PDU session or subset of PDU sessions, associated with a S-NSSAI, if identified by a data network name associated with a flag. In some embodiments, the configuration information comprises a request that the apparatus at least establish a PDU session in a network slice identified by a S-NSSAI when no DNN is configured for the S-NSSAI. In some embodiments, the configuration information comprises a request that the apparatus only establish a PDU session in a network slice identified by a S-NSSAI when at least one application needs to use the PDU session. In some embodiments, the configuration information comprises a request that the apparatus provide an explicit timer that causes the apparatus to release PDU sessions that are no longer associated with any applications.

According to still another embodiment, an apparatus can be provided that comprises means for providing, to user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI). In some embodiments, the configuration information comprises a request that the apparatus, by default, establishes a specific PDU session or subset of PDU sessions, associated with a S-NSSAI, if identified by a data network name associated with a flag. In some embodiments, the configuration information comprises a request that the apparatus at least establish a PDU session in a network slice identified by a S-NSSAI when no DNN is configured for the S-NSSAI. In some embodiments, the configuration information comprises a request that the apparatus only establish a PDU session in a network slice identified by a S-NSSAI when at least one application needs to use the PDU session. In some embodiments, the configuration information comprises a request that the apparatus provide an explicit timer that causes the apparatus to release PDU sessions that are no longer associated with any applications.

According to yet another embodiment, a computer program product can be provided that comprises at least one non-transitory computer-readable storage medium having computer-executable program code instructions stored therein, the computer-executable program code instructions comprising program code instructions configured, upon execution, to: provide, to user equipment, from a network entity in a communications system, configuration information in a downlink non access stratum transport message or a UE configuration update message comprising instructions that the user equipment always establishes all protocol data unit (PDU) sessions for all data network names associated with a single network slice selection assistance information (S-NSSAI). In some embodiments, the configuration information comprises a request that the user equipment, by default, establishes a specific PDU session or subset of PDU sessions, associated with a S-NSSAI, if identified by a data network name associated with a flag. In some embodiments, the configuration information comprises a request that the user equipment at least establish a PDU session in a network slice identified by a S-NSSAI when no DNN is configured for the S-NSSAI. In some embodiments, the configuration information comprises a request that the user equipment only establish a PDU session in a network slice identified by a S-NSSAI when at least one application needs to use the PDU session. In some embodiments, the configuration information comprises a request that the user equipment provide an explicit timer that causes the user equipment to release PDU sessions that are no longer associated with any applications.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
receiving, at a network entity of a communications system, from a user equipment, a registration request message;
in an instance in which the registration request message comprises information indicating the user equipment supports or requires a configuration of network-controlled slice selection behavior, transmitting, based on receiving the registration request message, from the network entity, to the user equipment, a registration acceptance or rejection message comprising configuration information including:
instructions for the user equipment to request all single network slice selection assistance information (S-NSSAI) of a configured network slice selection assistance information (NSSAI), or
instructions for the user equipment to request all S-NSSAI of a default configured NSSAI; and
providing, by a downlink non access stratum transport message or a user equipment configuration update message, from the network entity, to the user equipment, configuration information comprising instructions for the user equipment to request all S-NSSAI of a configured NSSAI or instructions for the user equipment to request all S-NSSAI of a default configured NSSAI.

2. The method of claim 1,
wherein the registration acceptance or rejection message or the downlink non access stratum transport message or the user equipment configuration update message comprises instructions for the user equipment to always request a subset of S-NSSAIs in the configured NSSAI.

3. The method of claim 2,
wherein the subset of S-NSSAIs is indicated explicitly or the subset of S-NSSAIs is identified by one or more flags associated with each S-NSSAI provided to the user equipment in the configured NSSAI or the default configured NSSAI,
wherein the subset of S-NSSAIs is determined by the network based on local policy or based on information received from subscription information of the user equipment.

4. The method of claim 1,
wherein the registration acceptance or rejection message or the downlink non access stratum transport message or the user equipment configuration update message comprises instructions for the user equipment to only request S-NSSAIs which have active applications.

5. The method of claim 4,
wherein the registration acceptance or rejection message or the downlink non access stratum transport message or the user equipment configuration update message comprises instructions for the user equipment to release network slices that are no longer used by any application, thereby excluding the released network slices from a next requested NSSAI.

6. A method comprising:
receiving, at a user equipment, from a network entity of a communications system, based on a registration request message previously transmitted from the user equipment to the network entity, the registration request message comprising information indicating the user equipment supports or requires a configuration of network-controlled slice selection behavior, a registration acceptance or rejection message comprising:
instructions for the user equipment to request all single network slice selection assistance information (S-NSSAI) of a configured network slice selection assistance information (NSSAI), or
instructions for the user equipment to request all S-NSSAI of a default configured NSSAI;
receiving a downlink non access stratum transport message or a user equipment configuration update message comprising configuration information including instructions for the user equipment to request all S-NSSAI of a configured NSSAI or instructions for the user equipment to request all S-NSSAI of a default configured NSSAI; and
configuring the user equipment to request, while the user equipment is in the communications system, all S-NSSAI of the configured NSSAI or the default configured NSSAI.

7. The method of claim 6,
wherein the registration acceptance or rejection message or the downlink non access stratum transport message or the user equipment configuration update message comprises instructions for the user equipment to always request a subset of S-NSSAIs in the configured NSSAI, and wherein the method further comprises configuring the user equipment to always request the subset of S-NSSAIs in the configured NSSAI.

8. The method of claim 7, wherein the subset of S-NSSAIs is identified by one or more flags associated with each S-NSSAI provided to the user equipment in the configured NSSAI or the default configured NSSAI.

9. The method of claim 6,
wherein the registration acceptance or rejection message or the downlink non access stratum transport message or the user equipment configuration update message comprises instructions for the user equipment to only request S-NSSAIs which have active applications,
and wherein the method further comprises configuring the user equipment to only request S-NSSAIs which have active applications.

10. The method of claim 9,
wherein the registration acceptance or rejection message or the downlink non access stratum transport message or the user equipment configuration update message comprises a timer configured to cause the user equipment to release network slices that are no longer used by any application, thereby excluding the released network slices from a next requested NSSAI,
and wherein the method further comprises configuring the user equipment to release, based upon a value of said timer, the network slices that are no longer used by any application and excluding the released network slices from the next requested NSSAI.

11. An apparatus, comprising:
at least one processor; and
at least one memory including computer program code, the at least one memory and the computer program code configured to, with the at least one processor, cause the apparatus at least to:
receive, at the apparatus, from a user equipment, a registration request message;
in an instance in which the registration request message comprises information indicating the user equipment supports or requires a configuration of network-controlled slice selection behavior, transmit, based on receiving the registration request message, from the apparatus, to the user equipment, a registration acceptance or rejection message comprising configuration information including:
instructions for the user equipment to request all single network slice selection assistance information (S-NSSAI) of a configured network slice selection assistance information (NSSAI), or
instructions for the user equipment to request all S-NSSAI of a default configured NSSAI; and
provide, by a downlink non access stratum transport message or a user equipment configuration update message, from the apparatus, to the user equipment, configuration information comprising instructions for the user equipment to request all S-NSSAI of a configured NSSAI or instructions for the user equipment to request all S-NSSAI of a default configured NSSAI.

12. The apparatus of claim 11,
wherein the registration acceptance or rejection message or the downlink non access stratum transport or the user equipment configuration update message comprises instructions for the user equipment to always request a subset of S-NSSAIs in the configured NSSAI.

13. The apparatus of claim 12,
wherein the subset of S-NSSAIs is indicated explicitly or the subset of S-NSSAIs is identified by one or more flags associated with each S-NSSAI provided to the user equipment in the configured NSSAI or the default configured NSSAI,
and wherein the subset of S-NSSAIs is determined by the network based on local policy or based on information received from subscription information of the user equipment.

14. The apparatus of claim 11,
wherein the registration acceptance or rejection message or the downlink non access stratum transport message or the user equipment configuration update message comprises instructions for the user equipment to only request S-NSSAIs which have active applications.

15. The apparatus of claim 14,
wherein the registration acceptance or rejection message or the downlink non access stratum transport message or the user equipment configuration update message comprises instructions for the user equipment to release network slices that are no longer used by any application, thereby excluding the released network slices from a next requested NSSAI.

16. An apparatus, comprising:
at least one processor; and
at least one memory including computer program code, the at least one memory and the computer program code configured to, with the at least one processor, cause the apparatus at least to:
receive, at the apparatus, from a network entity of a communications system, based on a registration request message previously transmitted from the apparatus to the network entity, the registration request message comprising information indicating the apparatus supports or requires a configuration of network-controlled slice selection behavior, a registration acceptance or rejection message comprising:
instructions for the apparatus to request all single network slice selection assistance information (S-NSSAI) of a configured network slice selection assistance information (NSSAI), or
instructions for the apparatus to request all S-NSSAI of a default configured NSSAI;
receive a downlink non access stratum transport message or a user equipment configuration update message comprising configuration information including instructions for the apparatus to request all S-NSSAI of a configured NSSAI or instructions for the apparatus to request all S-NSSAI of a default configured NSSAI; and
configure the apparatus to request, while the apparatus is in the communications system, all S-NSSAI of the configured NSSAI or the default configured NSSAI.

17. The apparatus of claim 16,
wherein the registration acceptance message comprises instructions for the apparatus to always request a subset of S-NSSAIs in the configured NSSAI, and
wherein the at least one memory and the computer program code are configured to, with the at least one processor, to configure the apparatus to always request the subset of S-NSSAIs in the configured NSSAI.

18. The apparatus of claim 17,
wherein the subset of S-NSSAIs is indicated explicitly or the subset of S-NSSAIs is identified by one or more flags associated with each S-NSSAI provided to the apparatus in the configured NSSAI or the default configured NSSAI.

19. The apparatus of claim 16,
wherein the registration acceptance or rejection message or downlink non access stratum transport message or the user equipment configuration update message comprises instructions for the apparatus to only request S-NSSAIs which have active applications, and wherein the at least one memory and the computer program code are configured to, with the at least one processor, to configure the apparatus to only request S-NSSAIs which have active applications.

20. The apparatus of claim 19, wherein the registration acceptance or rejection message or the downlink non access stratum transport message or the user equipment configuration update message comprises a timer configured to cause the apparatus to release network slices that are no longer used by any application, thereby excluding the released network slices from a next requested NSSAI, and wherein the at least one memory and the computer program code are configured to, with the at least one processor, to:

configure the apparatus to release, based upon a value of said timer, the network slices that are no longer used by any application, and exclude the released network slices from the next requested NSSAI.

* * * * *